US012651921B2

(12) United States Patent
Kim et al.

(10) Patent No.: US 12,651,921 B2
(45) Date of Patent: Jun. 9, 2026

(54) POWER MANAGEMENT DEVICE FOR APARTMENT HOUSES USING CONSERVATION VOLTAGE REDUCTION AND CHARGING SCHEDULING

(71) Applicant: CROCUS INC., Seoul (KR)

(72) Inventors: Bok Nyun Kim, Seoul (KR); Daniel Jesuph Lim, Seoul (KR)

(73) Assignee: CROCUS INC., Seoul (KR)

( * ) Notice: Subject to any disclaimer, the term of this patent is extended or adjusted under 35 U.S.C. 154(b) by 678 days.

(21) Appl. No.: 17/955,666

(22) Filed: Sep. 29, 2022

(65) Prior Publication Data

US 2024/0039320 A1     Feb. 1, 2024

(30) Foreign Application Priority Data

Aug. 1, 2022     (KR) ........................ 10-2022-0095197

(51) Int. Cl.
H02J 7/96 (2026.01)
B60L 53/63 (2019.01)
(Continued)

(52) U.S. Cl.
CPC ............... H02J 7/96 (2026.01); B60L 53/63 (2019.02); G05B 19/042 (2013.01);
(Continued)

(58) Field of Classification Search
CPC ............. H02J 7/007182; H02J 7/00032; H02J 7/0071; H02J 2300/20; H02J 2310/60;
(Continued)

(56) References Cited

U.S. PATENT DOCUMENTS

2011/0001356 A1 *   1/2011  Pollack ..................... H02J 7/00
                                                         307/31
2020/0307402 A1 *  10/2020  Poilasne ................. H02J 3/322

FOREIGN PATENT DOCUMENTS

JP        2015220862 A  * 12/2015
JP        2016073150 A  *  5/2016

OTHER PUBLICATIONS

Singh et al. (Peak load Relief in MV/LV Distribution Networks through Smart Grid-Enabled CVR with Droop Control EV2G Reactive Power Support, Date of Conference: Jan. 18-20, 2018, IEEE, 2018 International Conference on Power, Instrumentation, Control and Computing (PICC)) (Year: 2018).*

* cited by examiner

*Primary Examiner* — Kenneth M Lo
*Assistant Examiner* — Zachary Andrew Cain
(74) *Attorney, Agent, or Firm* — The PL Law Group, PLLC

(57) ABSTRACT

A power management device includes a pattern analyzer configured to analyze a demand pattern that is a power pattern for consumption by an apartment complex, a charging scheduler configured to receive a first demand pattern from the pattern analyzer, and to calculate a second demand pattern obtained by adjusting charging time of an electric vehicle charger, a prediction voltage calculator configured to receive power data from the pattern analyzer, and to calculate a prediction voltage of the apartment complex, and a controller configured to calculate a recommendation voltage for conservation voltage reduction (CVR) by using the prediction voltage, wherein the controller may be configured to perform control such that the recommendation voltage is an operation power of the apartment complex, and the operation power may satisfy the second demand pattern.

11 Claims, 20 Drawing Sheets

(51) Int. Cl.

| | |
|---|---|
| *G05B 19/042* | (2006.01) |
| *G06Q 10/1093* | (2023.01) |
| *H02J 7/40* | (2026.01) |
| *H02J 7/92* | (2026.01) |
| *H02J 101/20* | (2026.01) |

(52) U.S. Cl.
CPC ............ *G06Q 10/1093* (2013.01); *H02J 7/40* (2026.01); *H02J 7/92* (2026.01); *B60L 2260/50* (2013.01); *G05B 2219/2639* (2013.01); *H02J 2101/20* (2026.01)

(58) Field of Classification Search
CPC ...... B60L 53/63; B60L 2260/50; B60L 53/67; B60L 53/68; G05B 19/042; G05B 2219/2639; G06Q 10/1093
See application file for complete search history.

FIG. 2

Base and EV Charge Load Profile (No Controled)

Base and EV Charge Load Profile (Controled)

Base and EV Charge Voltage Profile ( Controled)

FIG. 11

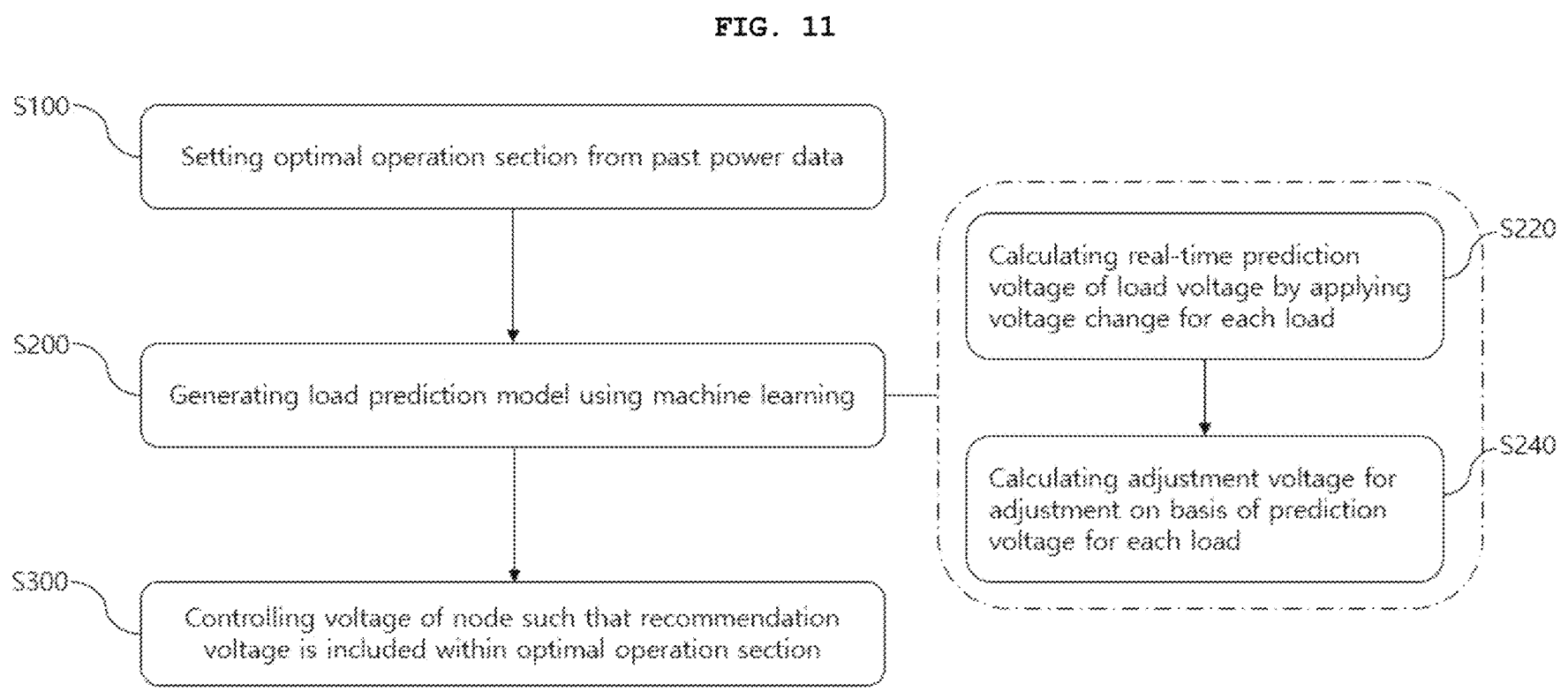

S100   Setting optimal operation section from past power data

S200   Generating load prediction model using machine learning

S300   Controlling voltage of node such that recommendation voltage is included within optimal operation section S220   Calculating real-time prediction voltage of load voltage by applying voltage change for each load S240   Calculating adjustment voltage for adjustment on basis of prediction voltage for each load

FIG. 15

| Power surplus storage amount (compared to average power surplus storage amount) | Consumption demand (compared to average consumption demand)) | Prediction voltage (compared to optimal operation section) | Adjustment voltage |
|---|---|---|---|
| Low | High | Drop | Rise |
| Low | Maintained | Drop or Maintained | Rise or Maintained |
| Low | Low | Rise, Maintained, or Drop | Drop, Maintained, or Rise |
| High | High | Rise, Maintained, or Drop | Drop, Maintained, or Rise |
| High | Maintained | Rise or Maintained | Drop or Maintained |
| High | Low | Rise | Drop |
| Very High | High | Rise | Drop |
| High | Very High | Drop | Rise |
| Very Low | Low | Rise | Drop |
| Low | Very Low | Rise | Drop |

FIG. 16

| First node prediction voltage (compared to optimal operation section) | Second node prediction voltage (compared to optimal operation section) | First voltage adjustment part | 2-1 voltage adjustment part | 2-2 voltage adjustment part |
|---|---|---|---|---|
| High | High | Drop | Maintained | Maintained |
| High | Maintained | Maintained | Drop | Maintained |
| High | Low | Maintained | Drop | Rise |
| Maintained | High | Maintained | Maintained | Drop |
| Maintained | Maintained | Maintained | Maintained | Maintained |
| Maintained | Low | Maintained | Maintained | Rise |
| Low | High | Maintained | Rise | Drop |
| Low | Maintained | Maintained | Rise | Maintained |
| Low | Low | Rise | Maintained | Maintained |

FIG. 17

| First node prediction voltage (compared to optimal operation section) | Second node prediction voltage (compared to optimal operation section) | First voltage adjustment part | 2-1 voltage adjustment part | 2-2 voltage adjustment part |
|---|---|---|---|---|
| 225V | 223V | 12V Drop | Maintained | Maintained |
| 220V | 212V | Maintained | 8V Drop | Maintained |
| 220V | 208V | Maintained | 8V Drop | 3V Rise |
| 212V | 220V | Maintained | Maintained | 9V Drop |
| 212V | 211V | Maintained | Maintained | Maintained |
| 211V | 209V | Maintained | Maintained | 2V Rise |
| 208V | 221V | Maintained | 3V Rise | 9V Drop |
| 208V | 211V | Maintained | 3V Rise | Maintained |
| 207V | 208V | 4V Rise | Maintained | Maintained |

Nominal voltage : 220V     Optimal operation section : 210~213V

| High-level system voltage adjustment(D1) | Prediction voltage of apartment complex(D2) | Combination of voltage adjustment and prediction voltage(D1+D2) | Voltage adjustment of apartment complex(D3) |
|---|---|---|---|
| Drop | Rise | Maintained | Maintained |
| Drop | Drop or Maintained | Low | Rise |
| Maintained | Rise | High | Drop |
| Maintained | Maintained | Maintained | Maintained |
| Maintained | Drop | Low | Rise |
| Rise | Drop | Maintained | Maintained |
| Rise | Rise or Maintained | High | Drop |

FIG. 20

| High-level system voltage adjustment(D1) | Prediction voltage of apartment complex(D2) | Combination of voltage adjustment and prediction voltage(D1+D2) | Voltage adjustment of apartment complex(D3) |
|---|---|---|---|
| Drop | Rise | 211V | Maintained |
| Drop | Drop or Maintained | 205V | 5V Rise |
| Maintained | Rise | 220V | 8V Drop |
| Maintained | Maintained | 213V | Maintained |
| Maintained | Drop | 209V | 2V Rise |
| Rise | Drop | 213V | Maintained |
| Rise | Rise or Maintained | 222V | 10V Drop |

Nominal voltage: 220V     Optimal operation section: 210~213V

POWER MANAGEMENT DEVICE FOR APARTMENT HOUSES USING CONSERVATION VOLTAGE REDUCTION AND CHARGING SCHEDULING

CROSS REFERENCE TO RELATED APPLICATION AND CLAIM OF PRIORITY

This application claims the benefit under 35 USC § 119 of Korean Patent Application No. 10-2022-0095197, filed on Aug. 1, 2022, in the Korean Intellectual Property Office, the entire disclosure of which is incorporated herein by reference for all purposes.

BACKGROUND

1. Field of the Invention

The present disclosure relates to a management device considering apartment houses of a power system and using both conservation voltage reduction through voltage optimization control and charging scheduling for charging time adjustment.

2. Description of the Related Art

Compared to internal combustion engine vehicles, it takes a long time for electric vehicles to be charged with electricity, which is fuel, so the electric vehicles need to be charged while the drivers are staying at home after returning home. In detached houses, individuals charge their electric vehicles using the commercial power of the house and adjust charging schedules without limitations. Unlike this, in apartment houses, such as apartments, etc., it is difficult for each resident of an apartment house to manage a charging schedule.

Due to the characteristics of an apartment house that needs to manage a plurality of chargers, a power allowable range of a substation of the apartment house, a power peak amount by time, or an electric rate of the entire apartment house may be considered for voltage control of the apartment house.

As the demand for electric vehicles has increased recently, a problem with charging electric vehicles occurs in the apartment houses including apartments, etc. due to the Korean residence format where many people live in an apartment house.

According to the Building Act, it is necessary to ensure that an electric vehicle-only parking area accounts for 3% of an old apartment house, and 5% of a new apartment house. As an electric vehicle parking area increases, the demand for electric vehicle chargers also increases. However, the capacity of a transformer of an apartment house cannot be easily changed, and this may increase the likelihood that problems with system stability will occur.

If the increased charging demand is concentrated at the same time, the system stability may become unstable. In addition, if additional electric vehicle chargers are installed to meet the increased demand for electric vehicles in addition to a demand pattern such as the maximum demand of an existing apartment complex, a transformer itself may need to be replaced in order to meet an increased demand peak.

However, replacing transformer infrastructure facilities is expensive, so a system for managing the power quality of an apartment complex stably while an existing transformer remains is required.

In addition, conservation voltage reduction (CVR) may be used as one of the energy reduction techniques including energy consumption reduction and peak load reduction for effective and stable power supply.

In the related art, conservation voltage reduction is mostly unilaterally performed for reasons, such as a power peak, on a consumer by a power exchange or power station, which is the side that supplies or controls power to a power system. However, recently, as a new power supply source including solar power or V2G to the power system has been developed, there is an increasing need to implement conservation voltage reduction near a node of a power receiving system.

The foregoing is intended merely to aid in the understanding of the background of the present disclosure, and is not intended to mean that the present disclosure falls within the purview of the related art that is already known to those skilled in the art.

SUMMARY

A power management device of the present disclosure may include a charging scheduler for adjusting the charging time of electric vehicles parked in an apartment complex in order to spread the electric vehicle charging demand of the apartment complex, and may enable the apartment complex in which electric vehicle chargers are installed to be operated in an optimal operation section subjected to conservation voltage reduction (CVR).

The power management device of the present disclosure may provide an apartment house power quality management method capable of dealing with the increasing charging demand while maintaining the existing transformer capacity of an apartment house.

According to the present disclosure, a difference between the maximum demand and the minimum demand is reduced and the demand pattern is flattened on the basis of analysis of the demand pattern by a pattern analyzer for the apartment complex, thereby managing the power quality of the apartment complex.

In the power management device of the present disclosure, power supplied from a power system to an apartment complex is distributed to facilities in the apartment complex including an electric vehicle charger through a switchboard installed in the apartment complex.

A controller of the present disclosure compares a second demand pattern to which charging scheduling is applied with a recommendation voltage to which a conservation voltage reduction (CVR) effect is applied. When the recommendation voltage does not satisfy the second demand pattern, the second demand pattern is used as past power data to calculate a new recommendation voltage.

The power management device of the present disclosure includes: a pattern analyzer configured to analyze a demand pattern that is a power pattern for consumption by the apartment complex; a charging scheduler configured to receive a first demand pattern from the pattern analyzer, and to calculate a second demand pattern obtained by adjusting charging time of the electric vehicle charger; a prediction voltage calculator configured to receive power data from the pattern analyzer, and to calculate a prediction voltage of the apartment complex; and a controller configured to calculate a recommendation voltage for conservation voltage reduction (CVR) by using the prediction voltage.

The controller of the present disclosure may be configured to perform control such that the recommendation voltage is an operation power of the apartment complex, and the operation power may satisfy the second demand pattern.

The power management device of the present disclosure can spread the charging demand of electric vehicles parked in the apartment complex in order to secure system stability of the power system related to a transformer capacity problem, and consider electric vehicle user convenience.

In addition, the power management device of the present disclosure enables the apartment complex to be stably operated within the optimal operation section considering future voltage distribution by predicting a voltage of the apartment complex.

The power management device of the present disclosure can provide an apartment house power quality management method capable of dealing with the increasing charging demand while maintaining the existing transformer capacity of the apartment house.

According to the present disclosure, an objective function for spreading the charging demand of the apartment complex can be set, and the charging start time minimizing the objective function can be calculated.

According to the present disclosure, the power demand pattern of the apartment complex managed by the power management device is determined, and in the power demand pattern, the electric vehicle charging amount consumed by the electric vehicle charger is distinguished from the amount of power fixedly consumed by each apartment of the apartment house, and the charging start time of electric vehicles parked in the parking lot of the apartment complex is scheduled, whereby the power situation of the apartment complex can be stabilized and costs can be reduced.

The power management device of the present disclosure uses a method of predicting a future voltage in order to minimize the loss caused by a low voltage and an overvoltage occurring due to the voltage adjustment based on a current voltage, thereby achieving voltage stability, maintaining the lowest voltage within an allowable range, and achieving the conservation voltage reduction effect. Accordingly, the power management device of the present disclosure may consider system stability of the power system of the apartment house, and customer convenience.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is a diagram illustrating a configuration of a power management device of the present disclosure;

FIG. 11 is a flowchart illustrating a power management device of the present disclosure;

FIG. 15 is a diagram illustrating a prediction voltage and an adjustment voltage calculated on the basis of a power surplus storage amount and a consumption demand of the present disclosure;

FIG. 16 is a diagram illustrating an adjustment voltage by a two-level voltage adjustment part of the present disclosure;

FIG. 17 is an example illustrating FIG. 16 in specific numerical values;

FIG. 18 is a diagram illustrating conservation voltage reduction by a controller when a voltage adjustment command of the present disclosure is issued;

FIG. 19 is a diagram illustrating a combined voltage and an adjustment voltage according to issuance of a voltage adjustment command of FIG. 18; and FIG. 20 is an example illustrating FIG. 19 in specific numerical values.

DETAILED DESCRIPTION OF THE INVENTION

Figure 1:
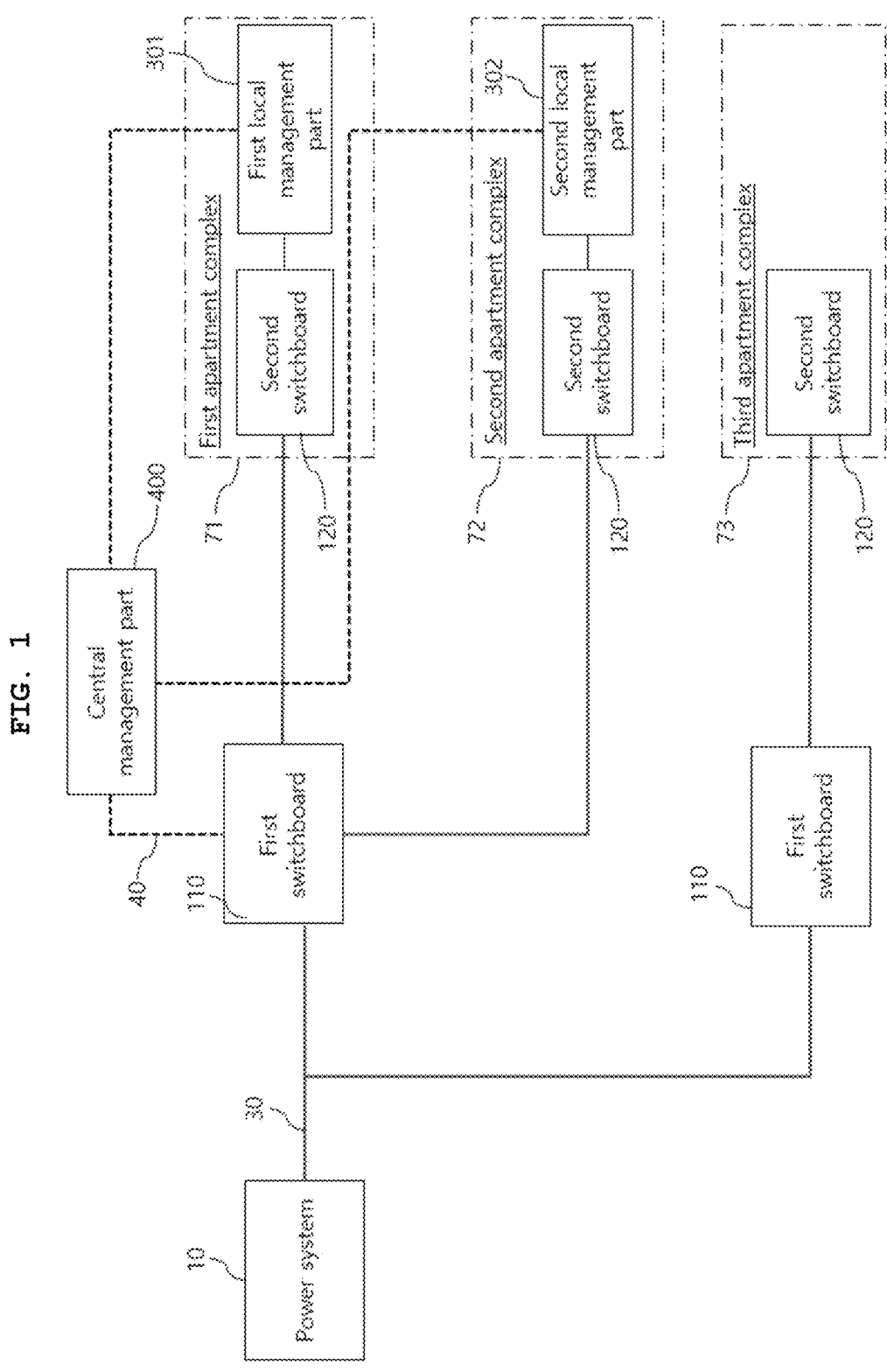
FIG. 1 is a diagram illustrating a central management part and a local management part of a power management device of the present disclosure.

Hereinbelow, exemplary embodiments of the present disclosure will be described in detail with reference to the accompanying drawings. Throughout the drawings, the same reference numerals will refer to the same or like parts.

A power management device of the present disclosure will be described with respect to apartment houses, such as apartments for residence, etc., for example. However, the present disclosure may be expandable and applied to any place, of which examples include a multipurpose building, such as a shopping center, etc., where multiple electric vehicle chargers are installed in the form of a large parking lot.

With reference to FIGS. 1 to 20, the power management device of the present disclosure applicable to an apartment complex 70 will be described.

Figure 4:
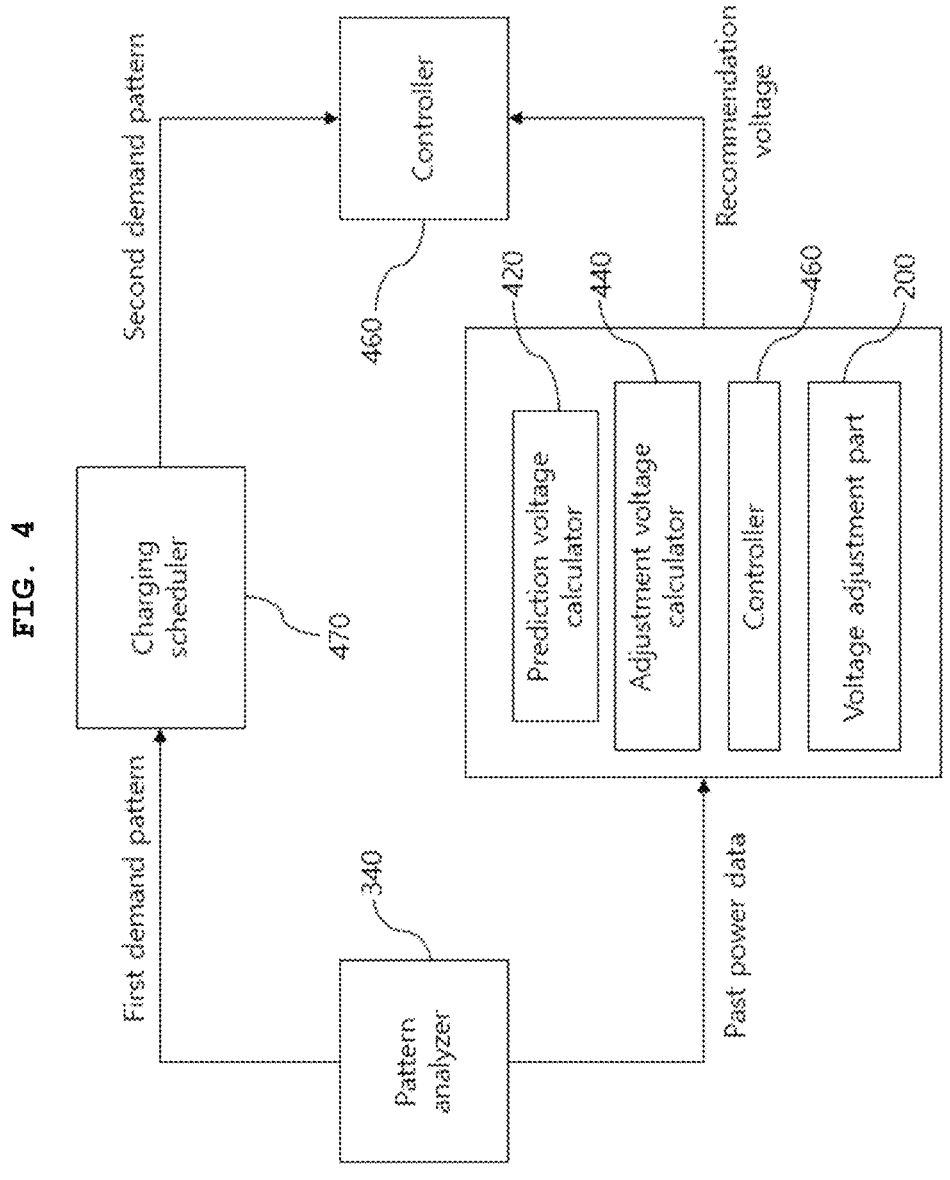
FIG. 4 is a diagram illustrating a relationship between a first demand pattern, a second demand pattern, past power data, and a recommendation voltage of the present disclosure.

First, with reference to FIG. 4, described will be calculation of a recommendation voltage of the apartment complex 70 subjected to conservation voltage reduction (CVR), and a relationship between a first demand pattern and a second demand pattern calculated by a charging scheduler 470. Conservation voltage reduction and charging scheduling will be described later.

A pattern analyzer 340 may analyze a demand pattern that is a power pattern for consumption by the apartment complex 70. The pattern analyzer 340 may be provided in a local management part 300 installed in the individual apartment complex 70, or may be provided in a central management part 400 that is connected to a plurality of apartment complexes 71 and 72 and located outside the apartment complexes 71 and 72. In either case, the pattern analyzer 340 may receive power data of the apartment complex 70 from a data collector 500 or a data storage 600 and may analyze the demand pattern. The location of the pattern analyzer 340 may be determined according to the distribution condition of the apartment complex 70 managed by the power management device of the present disclosure, and the condition of a switchboard 120 of the individual apartment complex 70.

The charging scheduler 470 may receive the first demand pattern from the pattern analyzer 340 to calculate the second demand pattern. In addition, the charging scheduler 470 may calculate the second demand pattern by using a basic pattern of the first demand pattern as a fixed value and using a charging pattern as a variable value.

The demand pattern including the first demand pattern and the second demand pattern may be divided into a basic pattern and a charging pattern. The basic pattern may include the consumption demand from each apartment of the apartment complex and the consumption demand from the shared part of the apartment complex. The charging pattern may include the electric vehicle charging amount of electric vehicle chargers L1 to L3 installed in the apartment complex 70.

The second demand pattern may be a result of adjusting the charging time of the electric vehicle chargers L1 to L3 in the first demand pattern. In addition, the second demand pattern may be a result of flattening a total demand pattern by spreading the electric vehicle charging amount in the first demand pattern. In addition, the second demand pattern may be a result of adjusting the charging time of the electric vehicle chargers so as to minimize a difference between the maximum demand and the minimum demand in the first demand pattern.

A prediction voltage calculator 420 may receive power data from the pattern analyzer 340, and may calculate a prediction voltage of the apartment complex 70. An adjustment voltage calculator 440 may use the prediction voltage to calculate an adjustment voltage for conservation voltage reduction. The adjustment voltage calculator 440 may determine the adjustment voltage by comparing the prediction voltage and an optimal operation section with each other.

A controller 460 may use the adjustment voltage to calculate a recommendation voltage for conservation voltage reduction. The controller 460 may set the optimal operation section in which the voltage of the apartment complex 70 is subjected to conservation voltage reduction (CVR), and may perform control such that the recommendation voltage of the apartment complex 70 is included within the optimal operation section having a conservation voltage reduction effect.

The controller 460 may perform control such that the recommendation voltage is the operation power of the apartment complex 70, and the operation power may satisfy the second demand pattern. The operation power satisfying the second demand pattern may mean that the operation power is set higher than the second demand pattern and sufficient electricity is supplied so that an emergency, such as a power failure, etc., does not occur.

In the meantime, the controller 460 may receive the second demand pattern from the charging scheduler 470, and may compare the second demand pattern with the calculated recommendation voltage.

If a first recommendation voltage is calculated from past power data extracted from the first demand pattern, a second recommendation voltage is calculated from past power data extracted from the second demand pattern to which electric vehicle charging scheduling is applied.

Accordingly, the controller 460 compares the second demand pattern with the recommendation voltage, and when the recommendation voltage does not satisfy the operation power satisfying the second demand pattern, the second demand pattern is used as past power data to calculate a new recommendation voltage.

If increased charging demand is concentrated at the same time, system stability may become unstable. In addition, if additional electric vehicle chargers are installed to meet the increased demand for electric vehicles in addition to a demand pattern such as the maximum demand of an existing apartment complex, a transformer itself may need to be replaced in order to meet an increased demand peak. However, substation or switchboard facilities of an apartment complex may be installed with a transformer, a load break switch (LBS), a vacuum circuit breaker (VCB), an air circuit breaker (ACB), a metering outfit (MOF), a power fuse (PF), a battery, a charger, etc. Replacing the transformer infrastructure facilities is expensive, so a system for managing the power quality of an apartment complex stably while an existing transformer remains may be required.

Accordingly, in order to deal with the increasing charging demand while maintaining the existing transformer capacity of an apartment house, the power management device of the present disclosure may provide an apartment house power quality management method capable of spreading electric vehicle charging demand by scheduling electric vehicle charging start time.

With reference to FIGS. 1 to 4, the structure of the power management device of the present disclosure will be described.

Figure 2:
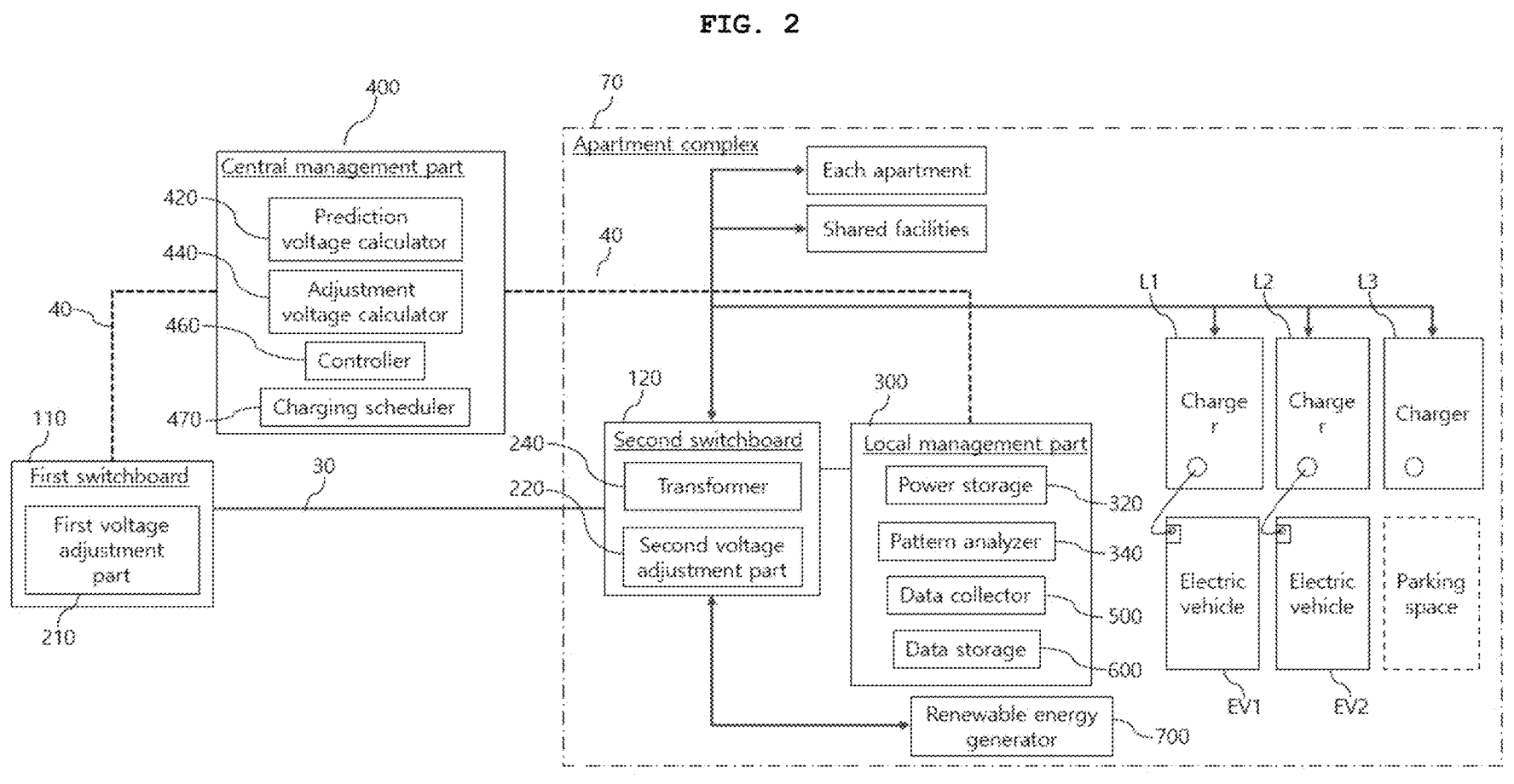

With reference to FIGS. 1 and 2, the power supplied from a power system 10 may be distributed to an apartment complex 70 that is a downstream node of the power system 10.

There may be a plurality of the apartment complexes 70 managed by the power management device of the present disclosure, for example, including a first apartment complex 71 and a second apartment complex 72. For the first apartment complex 71 and the second apartment complex 72, power may be distributed by one first switchboard 110 positioned at the upstream point of the power system 10, or power may be distributed by a plurality of the first switchboards 110.

The power supplied to an apartment complex 70 may be distributed to the facilities in the apartment complex 70 including electric vehicle chargers L1, L2, and L3, through the switchboard 120 installed in the apartment complex 70.

The facilities in an apartment complex 70 may include at least one selected from the group of each apartment, facilities for each apartment, shared facilities, and electric vehicle chargers L1 to L3.

The facilities of each apartment consuming power may include outlets, lighting fixtures, home appliances, etc. The facilities for each apartment consuming power may include the following: hot water circulation facilities for supplying, to the apartment, hot water supplied by district heating; water supply facilities for receiving tap water into a water tank and supplying cold water from the water tank to the apartment; heating facilities for floor heating, plumbing hot water, etc.; a home network of each apartment; and an emergency power source such as a communication terminal, etc.

The shared facilities may include: community facilities such as a library, gym, a senior center, etc.; exhaust fans for supplying outdoor air to an underground parking lot and discharging indoor air to the outside; drainage facilities for discharging underground water and rainwater to external drain conduits; stair lights for each building; lights and outlets in the underground parking lot; and freeze-preventing heating wires for water pipes, etc.

At a power supply side that supplies or distributes power to the power system 10, there is a power exchange, such as Korea Electric Power Corporation, for supplying power to the power system or capable of issuing a demand request (DR) when necessary, or a power station for supplying generated power to the power exchange.

At a side for receiving power from the power system 10, there is a demander that is a power consumer, or a demand management service provider capable of real-time reduction control and remote management in relation to the demander and capable of raising, registering, or managing demander members in relation to the power exchange. A demander may be the subject of power consumption, and may be the subject of a new source of supply that supplies power to a system including a solar power or electric vehicle. The demander may be an owner or user of each load of the present disclosure, and may belong to an individual demander on the basis of a group including a plurality of loads. The demand management service provider may be located between the power supply side and the demander with respect to the power system 10, and may control the power that the demander receives through the power system 10.

The power management device of the present disclosure may include the central management part 400 and the local management part 300. The central management part 400 may be located separately from an apartment complex 70, and may manage a plurality of the apartment complexes 70.

The central management part 400 may include the prediction voltage calculator 420 for calculating a prediction voltage, the adjustment voltage calculator 440 for calculating an adjustment voltage, and the controller 460 for performing overall control so that the power management device is operated.

The first switchboard 110 or the second switchboard 120 may include the following: an air circuit breaker (ACB), that is a power breaker using air in a low-voltage power circuit; a vacuum circuit breaker (VCB), that is a power breaker using vacuum in a high-voltage power circuit; a potential transformer (PT) for lowering a voltage of a high-voltage circuit to a low voltage so that various types of electrical data are measured; or a current transformer (CT) for converting a current of a large-current circuit to a small current so that electric current data is measured.

The power management device of the present disclosure may be controlled by the demand management service provider that manages the power quality of an apartment complex 70. The demand management service provider may transmit and receive data and signals to and from the local management part 300 provided in each apartment complex 70 through the central management part 400.

The power data collected by the data collector 500 may be transmitted to the management server 400 through a communication modem using wireless communication. Accordingly, all pieces of power data of each apartment complex 70 may be transmitted to the central management part 400.

The data storage 600 for storing therein the past power data collected by the data collector 500 may be provided. A load prediction model of the present disclosure may use the past power data of each apartment complex 70 stored in the data storage 600 to calculate future power prediction data.

In the case in which the central management part 400 receives power data continuously from a node of a power receiving system in real time, the data collector 500 and the data storage 600 may be included in the central management part 400. In the case in which the central management part 400 receives power data intermittently from an apartment complex 70 only when conservation voltage reduction is required, the data collector 500 and the data storage 600 may be provided in the apartment complex 70.

The controller 460 may use past power data of an apartment complex 70 to generate the load prediction model for calculating a recommendation voltage for conservation voltage reduction (CVR), in step S200. The load prediction model may include a series of steps from past power data to calculation of a recommendation voltage.

Figure 3B:
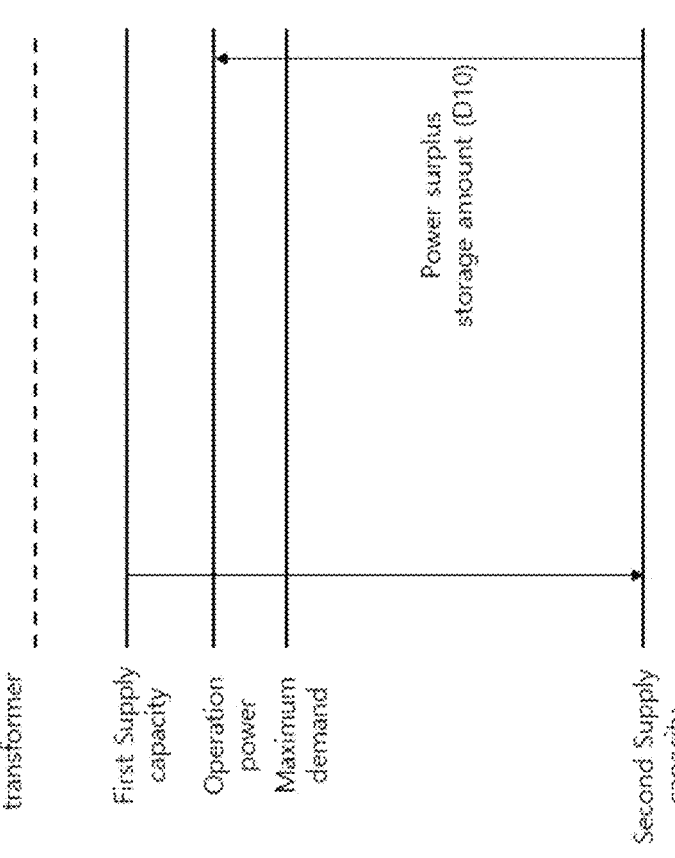
FIG. 3B is a diagram illustrating operation power supplied to an apartment complex of the present disclosure and considering a power surplus storage amount.
Figure 3A:
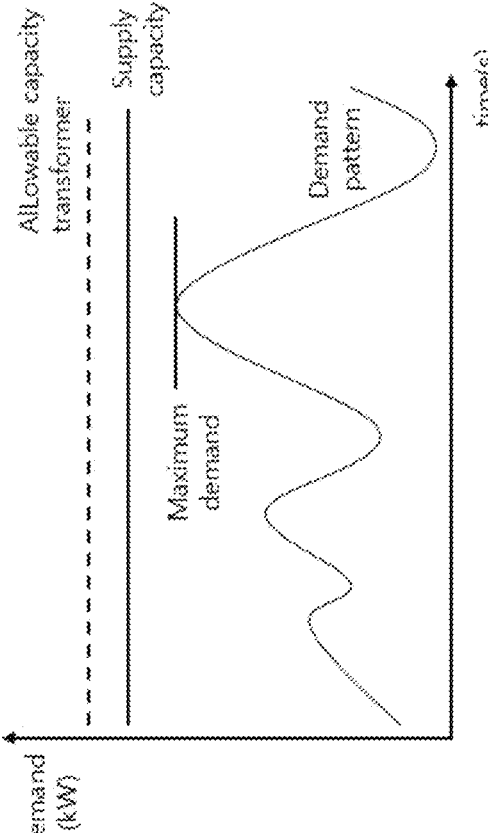
FIG. 3A is a diagram illustrating a supply capacity supplied to an apartment complex of the present disclosure.

Referring to FIG. 3A, in general, the supply capacity for which an apartment complex 70 makes a supply contract with a power supply source of the power system 10 may be within the allowable capacity of a transformer 240 installed in the apartment complex 70, and may be set or agreed to be higher than the maximum demand in the demand pattern of the apartment complex 70.

The demand pattern may be a consumption pattern of power that the apartment complex 70 consumes. The maximum demand may be the largest value in the demand pattern of the apartment complex 70 that consumes power for a predetermined period of time on a per-hour, week, or year basis. The supply capacity, which is the power supplied for an emergency such as a power failure, etc., is set higher than the maximum demand, so a significant portion of the power supplied to the apartment complex 70 may be wasted except the time period during which the maximum demand occurs.

The data collector 500 for collecting power data of the apartment complex 70, and the data storage 600 for storing therein the power data of the apartment complex 70 may be provided.

The pattern analyzer 340 for analyzing the demand pattern of the apartment complex 70 may be provided. The pattern analyzer 340 may use the power data of the data collector 500 and the data storage 600 to analyze the demand pattern.

The demand pattern may include consumption demand from each apartment of the apartment complex 70, consumption demand from a shared part of the apartment complex 70, and the electric vehicle charging amount D21 of the electric vehicle chargers L1 to L3.

The pattern analyzer 340 may perform at least one of the following: analysis of the demand pattern according to time on a per-hour, week, or year basis; analysis of the demand pattern of electric vehicle chargers in a parking lot adjacent to the building to which each apartment belongs; and analysis of the demand pattern of an electric vehicle that a resident of each apartment owns.

The power management device of the present disclosure may calculate a prediction voltage, an adjustment voltage, and a recommendation voltage on the basis of the analysis of the demand pattern by the pattern analyzer 340, and may set the optimal operation section subjected to conservation voltage reduction (CVR) by time. The power management device may perform setting or control such that the recommendation voltage is included in the optimal operation section, and the power management device may enable the recommendation voltage to satisfy the operation power with which the apartment complex 70 is operated.

In addition, the power management device may calculate a prediction voltage, an adjustment voltage, and a recommendation voltage on the basis of the analysis of the demand pattern by the pattern analyzer 340, may reduce the difference between the maximum demand and the minimum demand in the demand pattern of the apartment complex 70, and may flatten the demand pattern or demand pattern curve over time.

In this way, the power management device may manage the power quality of the apartment complex 70.

The optimal operation section for conservation voltage reduction (CVR) may be set in step S100, and a recommendation voltage may be included in the optimal operation section. Therefore, the recommendation voltage may be a value or section within the optimal operation section. A first voltage adjustment part 210 may adjust a system voltage with the received recommendation voltage.

The operation power with which the apartment complex 70 is operated may be the same as operating at a recommendation voltage having the CVR effect.

The lowest voltage within an allowable range may be included in the optimal operation section, and when the equipment of each node is operated with the lowest voltage within the allowable voltage range, the conservation voltage reduction (CVR) effect may be obtained.

The power management device may include a power storage 320 capable of storing power that may be supplied through charging or generated in the apartment complex 70. The power generated or supplied through charging in the apartment complex 70 may be reversely transmitted to the power system 10 or the power storage 320 installed in the apartment complex.

Supplying power to the apartment complex 70 may be performed by the electric vehicle chargers L1 to L3 or a renewable energy generator 700 in addition to the power system 10.

In the apartment complex 70, the renewable energy generator 700 may be provided, wherein the renewable energy generator 700 may be installed at a landscaping facility or the rooftop of the apartment complex 70, and is capable of generating renewable energy including solar power and wind power.

A power surplus storage amount D10 that is the power stored in the power storage 320 may include an electric vehicle surplus storage amount D11 of an electric vehicle EV parked in the apartment complex 70, or a renewable energy generation amount D12 generated by the renewable energy generator 700 installed in the apartment complex.

Accordingly, the power management device of the present disclosure may use the power surplus storage amount D10 to lower the supply capacity supplied from the power supply side, and as a result, may operate such that an electric rate paid by the apartment complex 70 is reduced.

A supply capacity set to be equal to or greater than the maximum demand for general operation may be referred to as a first supply capacity. The first supply capacity may be within the allowable capacity of the transformer 240 of the apartment house 70, and may be equal to or greater than the maximum demand in the demand pattern.

The power surplus storage amount D10 stored in the power storage 320 may be calculated through the demand pattern or the analysis of the demand pattern provided by the data collector 500, the data storage 600, and the pattern analyzer 340.

Referring to FIG. 3B, the apartment complex 70 may perform setting or make a contract to receive power with a second supply capacity from the power supply source that is a high-level system of the power system 10.

The second supply capacity may be applied when power is supplied to the power storage 320 of the apartment complex 70 and charging or storage takes place. This may be the case in which the power stored in electric vehicles EVs in the apartment complex 70 is supplied to the power storage 320 or the power system through the electric vehicle chargers L1 to L3, or the case in which the renewable energy generator 700 is installed at the landscaping facility.

The second supply capacity may be determined from the first supply capacity previously agreed to be received through a contract, and the power surplus storage amount D10.

The first supply capacity may be supply power agreed in a contract between the apartment complex 70 and the power supply source when electricity is only consumed by the apartment complex 10 without the power storage 320. However, the second supply capacity may be supply power newly set or agreed through a contract from the first supply capacity, considering the electric vehicle chargers L1 to L3, the renewable energy generator 700, the power storage 320, or the power surplus storage amount D10.

Accordingly, the second supply capacity may be smaller than the maximum demand, and thus, the electric rate to be paid by the apartment complex 70 may be reduced.

As a result, the apartment complex 70 may receive power with the second supply capacity lower than the existing first supply capacity by the power supply source, and may be run, operated, or managed with the operation power calculated using the second supply capacity and the power surplus storage amount D10.

Accordingly, the operation power may be set to satisfy the demand pattern that is a power pattern for consumption by the apartment complex 70. The operation power satisfying the demand pattern may mean that the operation power is set higher than the demand pattern and sufficient electricity is supplied so that an emergency, such as a power failure, etc., does not occur.

The operation power may be the power with which the apartment complex 70 is actually operated by the power management device of the present disclosure. As will be described later, the controller 460 may control the apartment complex 70 with the recommendation voltage satisfying conservation voltage reduction (CVR), and the controller 460 may perform setting or control such that the operation power of the apartment complex 70 is reached.

An electric vehicle EV that a resident of each apartment of the apartment complex 70 has may be charged by the electric vehicle chargers L1 to L3 after automatic authentication by a recognition means. Examples of the recognition means may include a pass of the apartment complex. The electric vehicle charging amount D21 consumed by each apartment may be added for each apartment and reported in a maintenance fee notice of the apartment complex 70.

In the meantime, the electric vehicle chargers Ls may be installed by the demand management service provider that manages the power management device of the present disclosure. A driver of an electric vehicle may separate a connector provided on the electric vehicle charger L and may connect the electric vehicle charger L to the electric vehicle EV, and charging may be performed after transmission and reception through the connector or wireless communication between the electric vehicle charger L and the electric vehicle EV.

Unlike this, electric vehicle charging methods may include a method in which without electric vehicle charger (L) infrastructure facilities, an electric vehicle driver plugs a charger integrated with a connector and a terminal into an outlet provided in a parking lot to charge the electric vehicle. The driver may charge the electric vehicle through an authentication process of the terminal. In this case, the demand management service provider that manages the power management device of the present disclosure may be in a cooperative management relationship with a terminal company, or the demand management service provider itself may provide the terminal.

The demand management service provider may receive data of power with which charging is performed by the electric vehicle chargers Ls or the connector-integrated terminal, and may use the data to analyze or manage the demand pattern of the apartment complex 70 regardless of the two types of charging methods.

With reference to FIGS. 5 to 10, the adjustment of electric vehicle charging time by the charging scheduler 470 of the present disclosure will be described.

The power management device of the present disclosure may include the charging scheduler 470 for adjusting the charging time of the electric vehicle chargers L1 to L3.

The demand pattern that a pattern of power consumed by the apartment complex 70 may be divided into the basic pattern and the charging pattern. The basic pattern may include the consumption demand from each apartment of the apartment complex and the consumption demand from the shared part of the apartment complex. The charging pattern may include the electric vehicle charging amount of the electric vehicle chargers Ls installed in the apartment complex 70.

Figure 5:
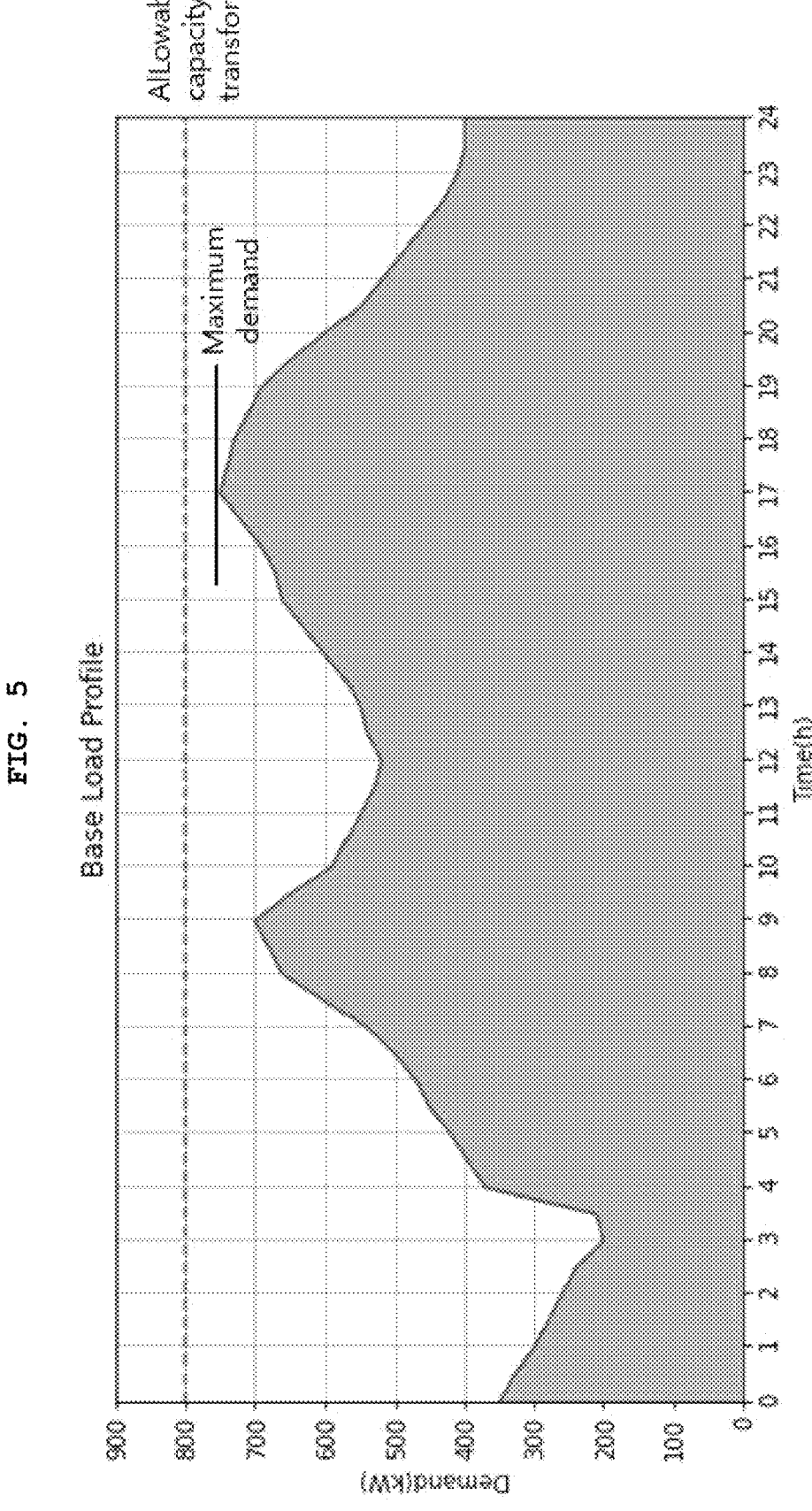
FIG. 5 is a diagram illustrating a basic pattern in a demand pattern of the present disclosure.
Figure 6:
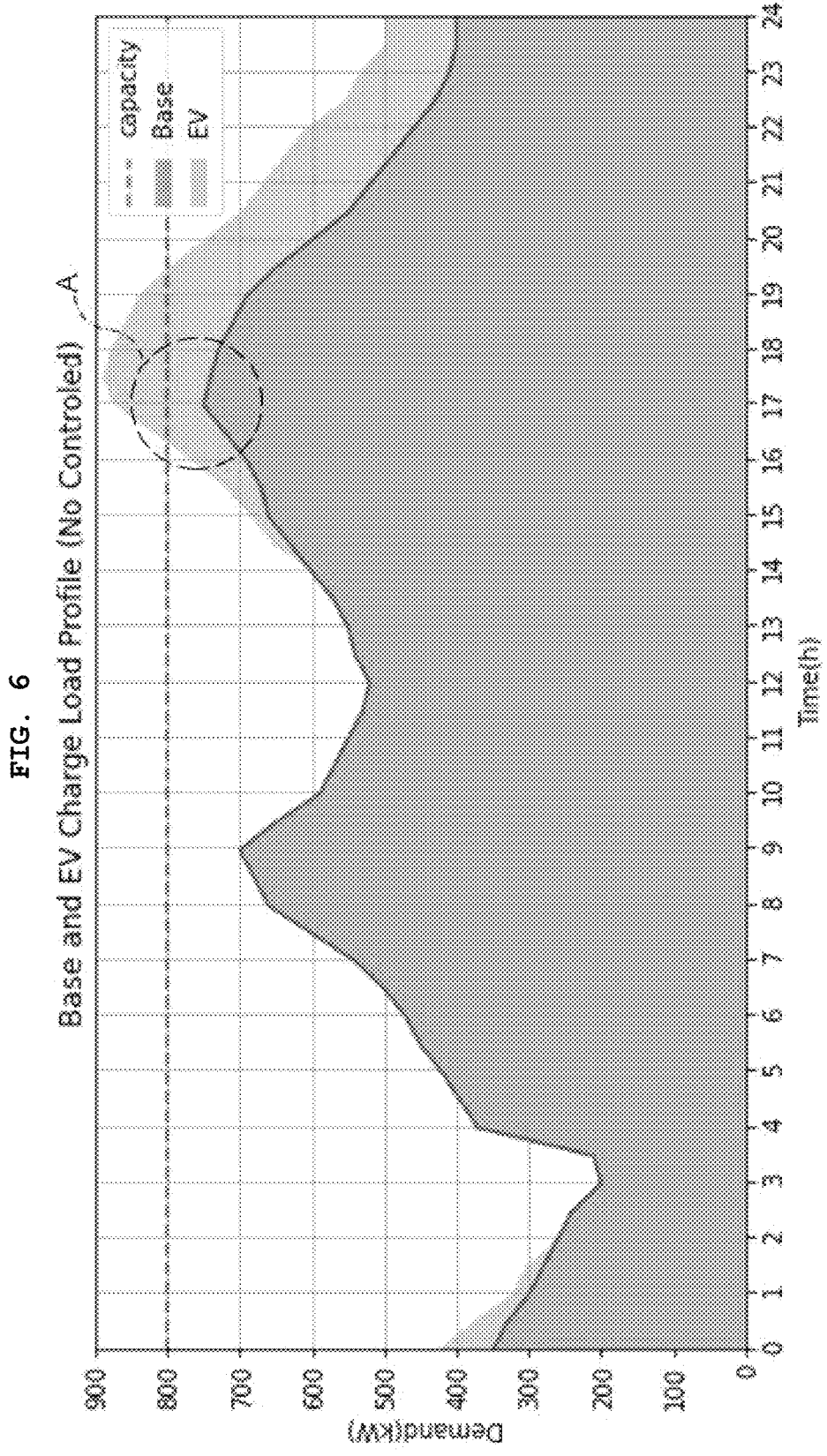
FIG. 6 is a diagram illustrating an embodiment in which the power management device of the present disclosure is not applied to the entire demand pattern including a charging pattern.
Figure 7:
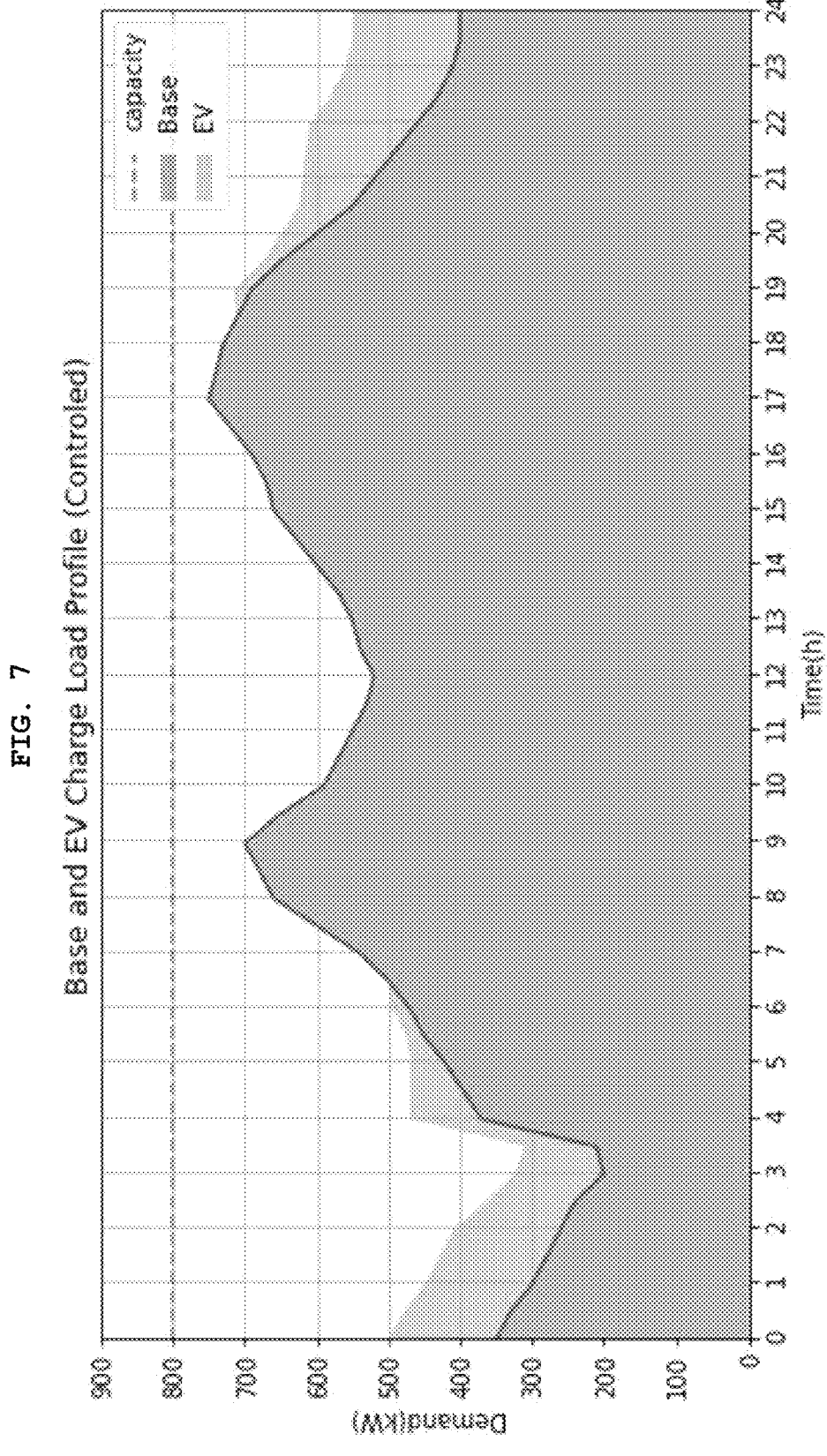
FIG. 7 is a diagram illustrating an embodiment in which the power management device of the present disclosure is applied to the entire demand pattern including a charging pattern.

FIGS. 5 and 6 may be about the first demand pattern before charging scheduling is applied, and FIG. 7 may be about the second demand pattern to which charging scheduling is applied.

FIG. 5 shows that the basic pattern of the load when there is no electric vehicle charging demand in the apartment complex 70. The basic pattern may show the consumption demand for power consumed in the apartment complex 70 separately from the electric vehicle charger (L) facilities. Although not exceeding the allowable capacity of the transformer, the maximum demand in the basic pattern may approach the allowable capacity of the transformer during the time when the demand is concentrated.

The pattern analyzer 340 of the present disclosure may analyze one of the following: the demand pattern according to time on a per-hour, week, or year basis; the demand pattern of electric vehicle chargers in a parking lot adjacent to the building to which each apartment belongs; and the demand pattern of an electric vehicle than a resident of each apartment owns. Using this, the present disclosure may provide optimal power consumption scheduling to each apartment.

Focusing on the management of the electric vehicle chargers Ls of the present disclosure, the basic pattern analyzed by the pattern analyzer 340 may be referred to as a fixed value or a fixed demand pattern, and the charging pattern by electric vehicle charging may be referred to as a controllable variable value or a variable demand pattern.

Accordingly, the charging scheduler 470 may optimize the demand pattern of the apartment complex 70 by using the basic pattern as a fixed value and the charging pattern as a variable value.

Optimization of the demand pattern of the apartment complex 70 may be to adjust the charging time of the electric vehicle chargers so as to minimize the difference between the maximum demand and the minimum demand in the demand pattern.

FIG. 6 shows the state in which the charging pattern is not yet spread by the power management device and the total demand pattern exceeds the limit capacity of the transformer 240 installed in the apartment complex 70 at the power peak point A because of the increased demand for the electric vehicle chargers Ls. For example, when an electric vehicle user who has returned to the apartment complex 70 starts charging, the charging demand may be concentrated at the same time in the evening, and the allowable capacity of the transformer may be exceeded unfortunately.

FIG. 7 shows the total demand pattern to which the power management device of the present disclosure is applied, wherein the total demand pattern includes both the basic pattern including the consumption pattern for each apartment or a shared part of the apartment complex 70, and the charging pattern according to electric vehicle charging. It is found that the charging demand of the apartment complex 70 is spread by the pattern analyzer 340 and the charging scheduler 470 of the present disclosure.

Accordingly, the charging scheduler 470 may minimize the difference between the maximum demand and the minimum demand in the demand pattern on the basis of the analysis of the demand pattern by the pattern analyzer 340, and may flatten the demand pattern over time.

The charging scheduler 470 may distribute the electric vehicle charging amount in the charging pattern to fill the local minimum point in the basic pattern.

The adjustment of charging time by the charging scheduler 470 may mean that the charging scheduler 470 sets an objective function and calculates the charging start time or charging delay time for minimizing the objective function.

The objective function may include at least one selected from the group of the maximum demand of the demand pattern, a difference between the maximum demand and the minimum demand of the demand pattern, a variation value of the demand pattern, and charging cost.

The objective function may be given as Equation 1.

$$\text{Loss}(t)P_{peak}+P_{diff}+P_{var}+C_{ev} \qquad \text{[Equation 1]}$$

Herein, Loss(t) may denote the objective function, $P_{diff}$ may denote the difference between the maximum demand and the minimum demand of the demand pattern, $P_{var}$ may denote a variation value of a power load or the variation value of the demand pattern, and $C_{ev}$ may denote the charging cost.

The difference (Pdiff) between the maximum demand and the minimum demand of the demand pattern may be expressed as Equation 2.

$$P_{diff}=P_{peak}-P_{valley} \qquad \text{[Equation 2]}$$

Herein, $P_{peak}$ may denote the maximum demand or maximum power of the demand pattern, and may be given as Equation 3. $P_{valley}$ may denote the minimum demand or minimum power of the demand pattern, and may be given as Equation 4.

$$P_{peak}=\max P_{total,i}(t), i \in \{1, \ldots, N\} \qquad \text{[Equation 3]}$$

Herein, $P_{total,i}$ may denote power for timestamp i or a demand pattern for timestamp i.

$$P_{valley}=\min P_{total,i}(t), i \in \{1, \ldots, N\} \qquad \text{[Equation 4]}$$

Herein, $P_{total,i}$ may denote power for timestamp i or a demand pattern for timestamp i.

The total demand pattern ($P_{total}$) by adding the basic pattern and the charging pattern may be given as Equation 5.

$$P_{total}=P_{base}+P_{ev}(t) \qquad \text{[Equation 5]}$$

Herein, $P_{base}$ may be the power when there is no electric vehicle, and may be the power predicted before the charging pattern for the electric vehicle charging amount is added. $P_{ev}$ may denote the charging pattern by electric vehicle charging.

The variation value (Pvar) of the demand pattern may be given as Equation 6.

$$P_{var}=E[(P_{total}-P_{mean})^2] \qquad \text{[Equation 6]}$$

Herein, E may denote the average, $P_{total}$ may denote the demand pattern according to Equation 5, and $P_{mean}$ may denote the average power.

The charging cost ($C_{ev}$) that may be considered in the objective function may be given as Equation 7.

$$C_{ev}=\tau P_{ev,i}(t)\cdot C_i \qquad \text{[Equation 7]}$$

Herein, $P_{ev,i}$ may denote the charging power demand for timestamp i, and Ci may denote a rate per unit power for timestamp i.

In the power management device of the present disclosure, the optimal charging scheduling for the apartment complex 70 may mean that the constraint conditions given in Expression 8 and Expression 9 are satisfied and the charging start time t for minimizing the objective function Loss(t) is calculated.

$$V_{min}<V<V_{max} \qquad \text{[Expression 8]}$$

Expression 8 may be a condition for the level of voltage (V) at which an apartment complex 70 is operated, $V_{max}$ may refer to an upper limit of voltage, and $V_{min}$ in may refer to a lower limit of voltage.

$$P_{total}<P_{capacity} \qquad \text{[Expression 9]}$$

Herein, $P_{total}$ may denote the entire demand pattern of an apartment complex 70, and $P_{capacity}$ may denote the maximum allowable capacity of the transformer 240 installed in the apartment complex 70.

Figure 8:
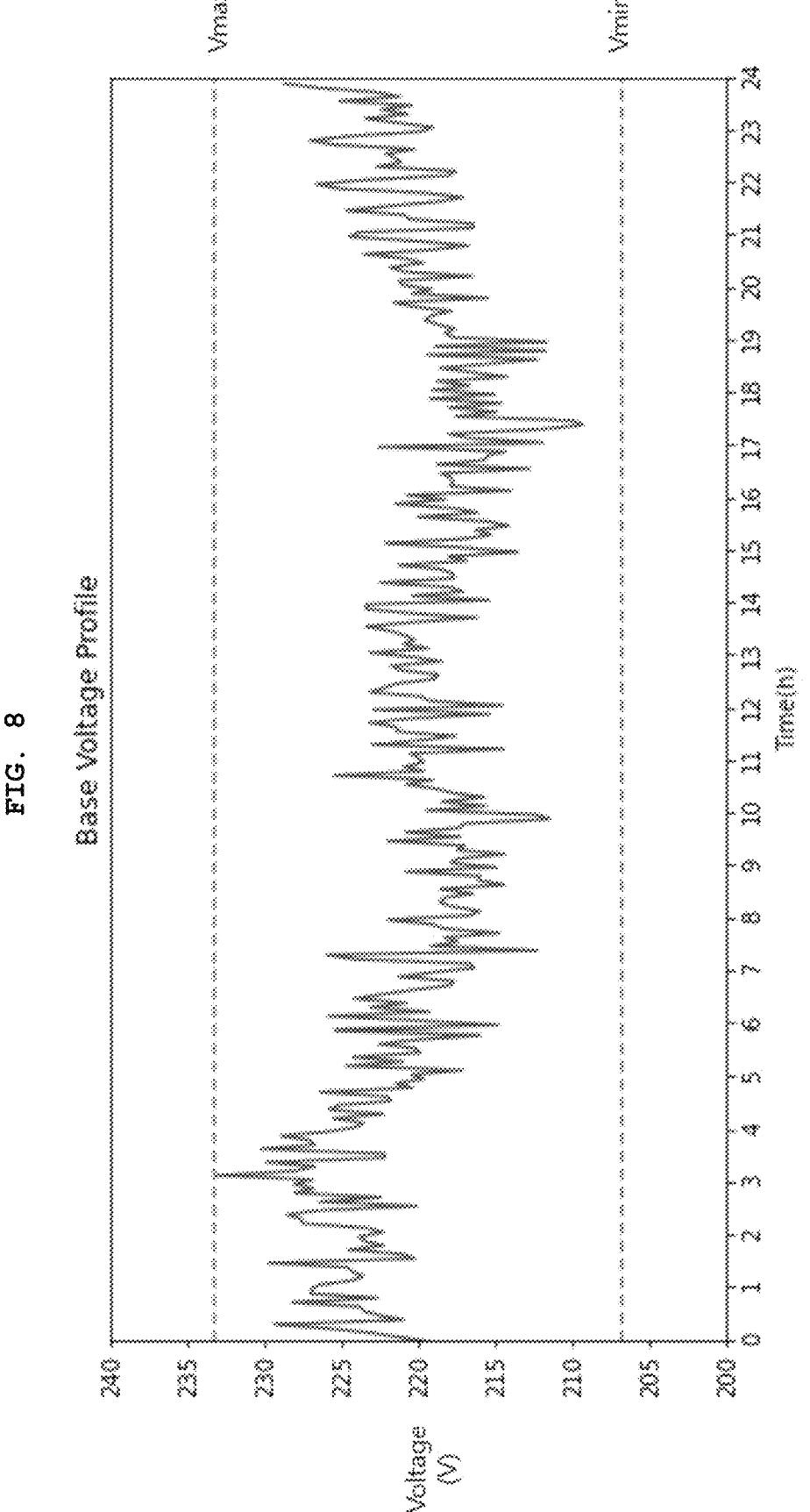
FIG. 8 is a diagram illustrating a basic voltage profile in which a portion related to electric vehicle charging is excluded from the voltage of an apartment complex of the present disclosure.
Figure 9:
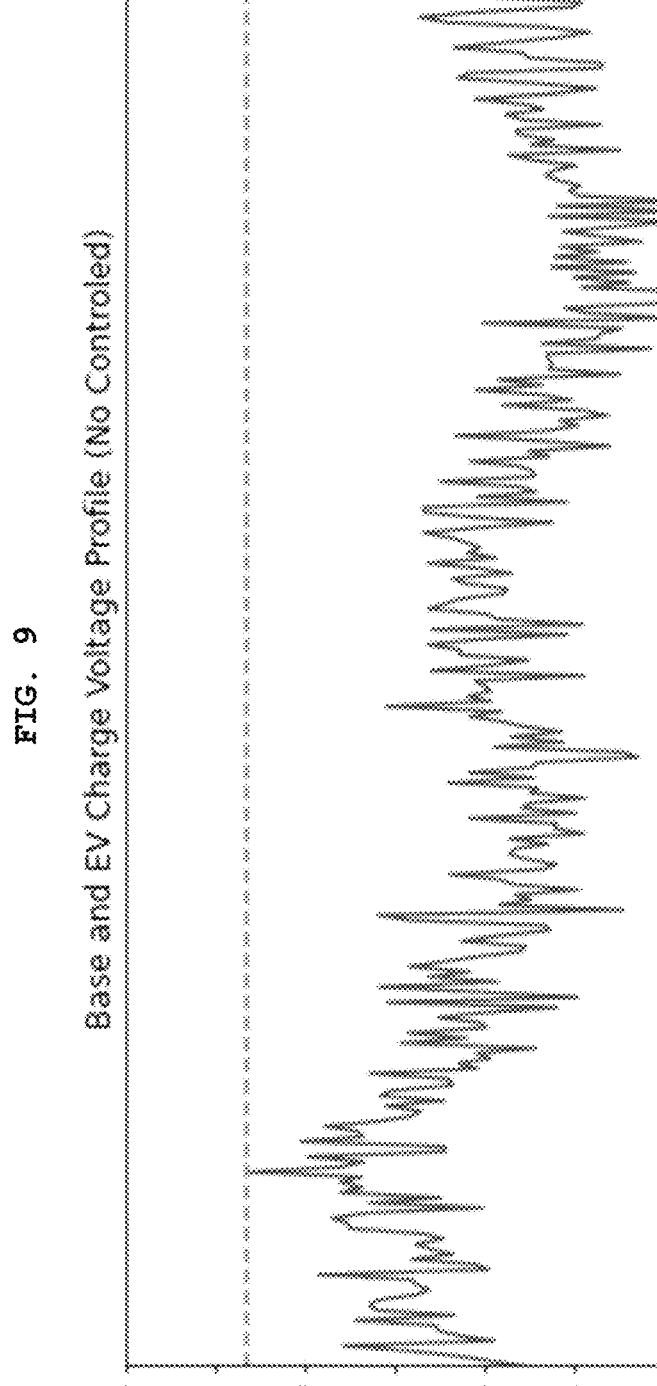
FIG. 9 is a diagram illustrating an embodiment in which the power management device of the present disclosure is not applied to a voltage of an apartment complex including electric vehicle charging.
Figure 10:
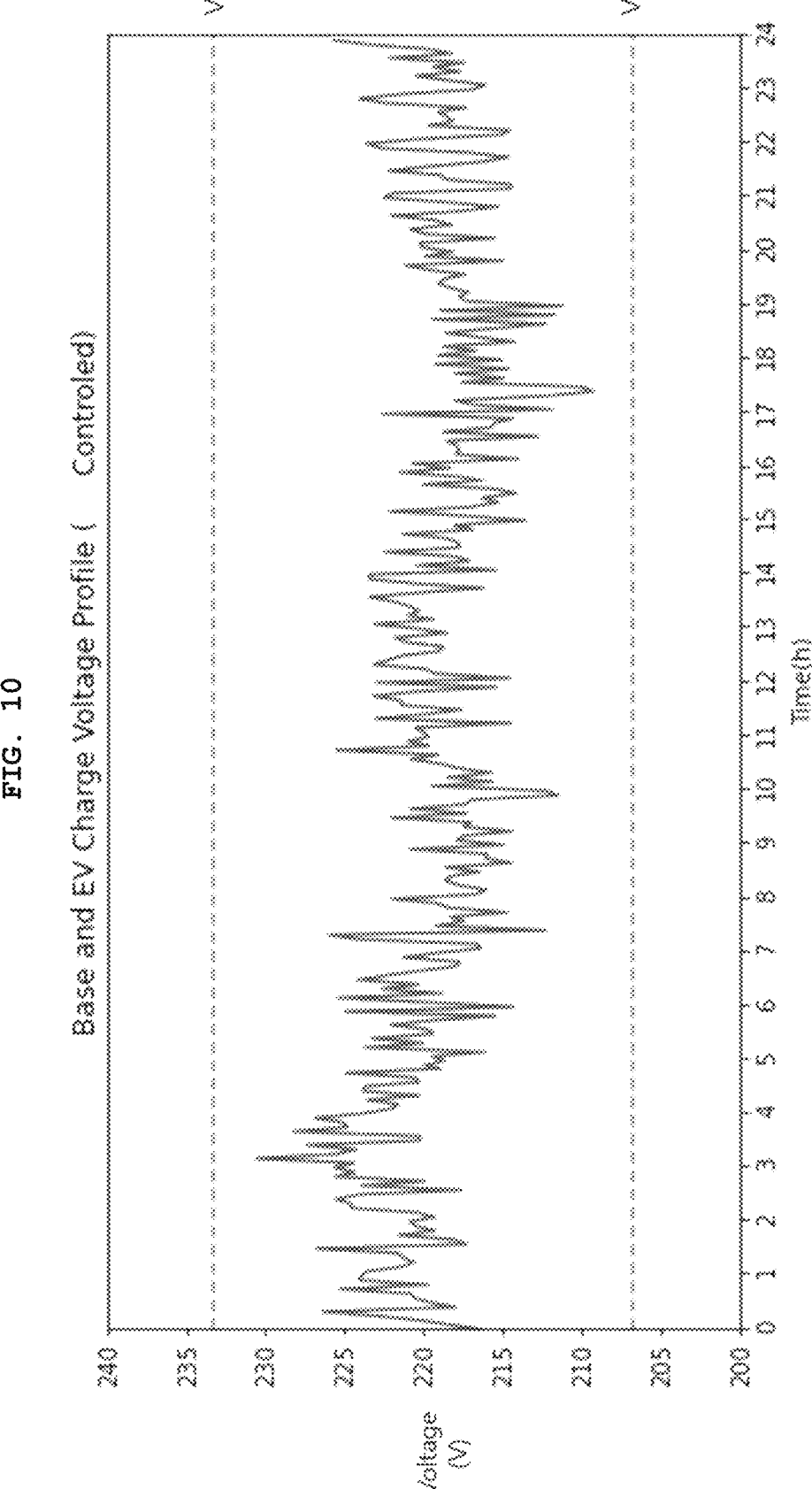
FIG. 10 is a diagram illustrating an embodiment in which the power management device of the present disclosure is applied to a voltage of an apartment complex including electric vehicle charging.
Figure 12:
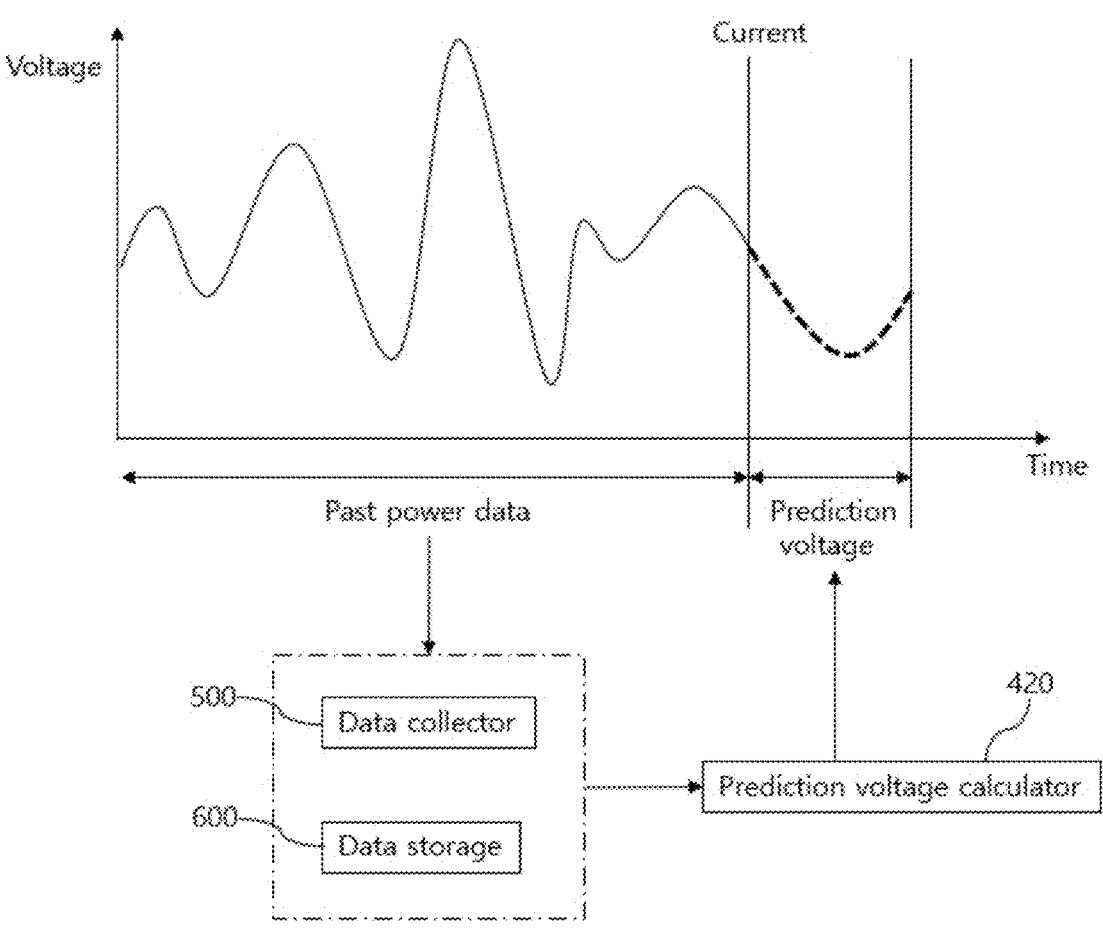
FIG. 12 is a diagram illustrating past power data and a prediction voltage of the present disclosure.

FIGS. 8 to 10 show the voltage patterns of the apartment complex 70 over time. FIGS. 8 and 9 may show the voltage distribution for the first demand pattern before charging scheduling is applied, and FIG. 10 may show the voltage distribution for the second demand pattern to which charging scheduling is applied.

FIG. 8 may show the voltage of the apartment complex 70 when there is no electric vehicle charging demand. FIG. 8 may correspond to FIG. 5, FIG. 9 may correspond to FIG. 6, and FIG. may correspond to FIG. 7.

The dotted lines may indicate the upper limit of voltage and the lower limit of voltage of the apartment complex 70.

When the demand or load of the apartment complex 70 increases, the voltage of the apartment complex 70 may decrease. When the demand or load of the apartment complex 70 decreases, the voltage of the apartment complex 70 may increase.

Referring to FIG. 9, when electric vehicle users who have returned their home starts charging, the charging demand is concentrated in the evening and the voltage of the apartment complex 70 may drop. When the local minimum point A of the voltage of the apartment complex 70 reaches the lower limit of voltage, resulting in a risk of a power failure of the apartment complex 70, etc. The local minimum point A of the voltage of the apartment complex 70 may correspond to the power peak point A in the total demand pattern.

Referring to FIG. 10, it is found that the charging demand of the apartment complex 70 is spread by the pattern analyzer 340 and the charging scheduler 470.

The charging scheduler 470 may enable the local maximum point of the voltage of the apartment complex 70 to be away from the upper limit of voltage, and may enable the of the voltage of the apartment complex 70 to be away from the lower limit of voltage.

The charging scheduler 470 may increase the demand or load and decrease the voltage at dawn when vehicles are parked, and may flatten the power stably even during the demand or load peak time. Accordingly, the pattern analyzer 340 and the charging scheduler 470 of the present disclosure may spread the charging demand of the apartment complex 70.

In the meantime, the charging scheduler 470 may have a first mode and a second mode, which are separate modes.

In the first mode, the charging start time calculated by the charging scheduler 470 may be simultaneously applied to the electric vehicles EVs parked in the apartment complex 70.

In the second mode, the charging start time calculated by the charging scheduler 470 may be delayed differently considering the options to electric vehicle users who want to charge their electric vehicles.

The options to the electric vehicle users may include at least one selected from the group of slow charging or quick charging, the charging completion time, and the charging amount.

An electric vehicle user may select the options when trying to start charging through the electric vehicle charger L with a connector, etc.

An electric vehicle user may select quick charging when the user wants to drive the electric vehicle immediately for reasons such as going out, or may select slow charging when the user wants to park the electric vehicle until the next morning after general returning home.

The electric vehicle user may select the time at which the charging of the electric vehicle is completed. The power management device may set the charging completion before normal office-going hours by default, and may determine whether to finish charging especially at dawn even if it is not quick charging.

The electric vehicle user may select his or her electric vehicle charging amount. The electric vehicle user may select whether to charge his or her electric vehicle to 100% before going to work the next day, only 50%, or not need charging, considering his or her usual electric vehicle usage pattern.

In addition, when the electric vehicle user does not intend to use the electric vehicle the next day for reasons such as a day off, the electric vehicle user may select the option of allowing the power stored in his or her electric vehicle battery to be reversely transmitted to the power storage 320 installed in the apartment complex 70.

The first mode may be the case in which parked electric vehicles need to be simultaneously processed because of the intention of people living in the apartment complex 70 or limitations of infrastructure construction. This is to schedule the charging start time without considering the circumstances of each electric vehicle user, so there is no choice but to perform charging scheduling conservatively and stably to complete charging the next day.

In the second mode, various charging methods may be provided according to the selection of the electric vehicle user, thereby saving more energy and increasing cost reduction efficiency compared to the first mode. In addition, the electric vehicle user may use his or her electric vehicle battery like an energy storage system (ESS). The power management device may adjust the charging scheduling of the apartment complex 70 flexibly by using the renewable energy generated by the renewable energy generator 700 installed at a landscaping feature because of the characteristics of the apartment complex 70, and by using the amount of power stored in the electric vehicle batteries.

An electric vehicle that a resident of each apartment of the apartment complex 70 has may be changed by the electric vehicle charger L after automatic authentication by the recognition means. Examples of the recognition means may include a pass of the apartment complex 70, etc. As the recognition means, any means capable of tracking the electric vehicle charging amount that a resident of each apartment charges within the apartment complex 70 may be used. The electric vehicle charging amount consumed by each apartment may be added for each apartment and reported in a maintenance fee notice of the apartment complex 70.

In the second mode, a benefit may be given to the electric vehicle users who assist the power management device in charging scheduling.

The behaviors of assisting in charging scheduling may include selecting slow charging, and allowing the power stored in an electric vehicle battery to be reversely transmitted to the power storage of the apartment complex.

The charging scheduler 470 may give an electric rate reduction or discount benefit to a resident who has done the behavior of assisting in charging scheduling, and may apply the benefit when making calculation for a maintenance fee notice.

According to the present disclosure, increasing electric vehicle charger (L) equipment is operated without costly transformer infrastructure replacement, such as replacement of the transformer 240, so that the stability of the power system related to a problem with the capacity of the transformer 240 can be secured. In addition, the parking time not used by electric vehicle users is used, the options of each electric vehicle user are considered, and charging is completed before the time desired by an electric vehicle user, thereby satisfying electric vehicle user convenience.

With reference to FIGS. 11 to 20, it will be described that the apartment complex 70 is operated with the operation power to which conservation voltage reduction (CVR) is applied.

The power management device of the present disclosure predicts a change in the voltage of the apartment complex 70 connected to the power system 10 in real time, and operates such that the voltage of a plurality of the apartment complexes 70 is within the respective allowable capacities of the transformers and the low section.

Conservation voltage reduction (CVR) may be for reducing the power supplied to a load and thus reducing the power consumed by the load.

The conservation voltage reduction may be used as one of the energy reduction techniques for energy consumption reduction and peak load reduction to supply power efficiently and stably.

The conservation voltage reduction may be for reducing a feeder voltage to reduce power consumption. That is, the conservation voltage reduction (CVR) for supplying power stably and efficiently to network connection may lower a voltage, reduce the size of the load, and reduce power consumption, and may be used in an emergency such as imbalance between supply and demand.

Conventionally, the conservation voltage reduction (CVR) is mainly operated in a way that when peak demand occurs, the power supply side unilaterally reduces the power consumed by a consumer. However, recently, a new power supply source including solar power or V2G to the system has been developed. Accordingly, a load of a consumer may not only receive power from the power system 10 and simply consume the power, but also reversely supply generated or stored energy. The power generated or supplied through charging in the apartment complex may be reversely transmitted to the power system 10 or to the power storage 320 installed in the apartment complex.

Therefore, there is an increasing need to implement conservation voltage reduction near a node of the power receiving system.

With respect to the power system 10, the power supply side may be positioned upstream and the power demand side may be positioned downstream. In this specification, the power demand side may be used interchangeably with the consumer, the power receiving system, or the node of the power receiving system.

According to the present disclosure, the conservation voltage reduction effect may be obtained from the operation with the lowest voltage within the allowable voltage range. Even though the voltage of the node is lowered to the recommendation voltage subjected to conservation voltage reduction, the operation of the equipment of the node may not be affected. The power is reduced as the voltage is reduced, so the demander or consumer may save an electric rate.

In order to maintain the voltage of the equipment in a low-voltage section, being aware of a future voltage enables preparation, so the stable operation with the low-voltage section may be achieved. If the voltage is adjusted on the basis of the current time, an overvoltage or low voltage that would not has occurred without adjustment may occur. Therefore, the prediction voltage calculator 420 may predict a change in the voltage of the load in real time in step S220 in order to adjust the voltage considering the future voltage.

The controller 460 may set the allowable voltage range suitable for the operation of the apartment complex 70, and the controller 460 may set the optimal operation section included in the allowable voltage range in step S100. Since the optimal operation section is for power consumption reduction, the optimal operation section may be included in the low-level section of the allowable voltage range.

The machine learning methods that the prediction voltage calculator 420 uses to calculate a prediction voltage may include Kernel regression, an autoregressive (AR) model, and a moving average (MA) model.

The adjustment voltage calculator 440 may calculate an adjustment voltage, which is a voltage value for adjustment, on the basis of the prediction voltage calculated by the prediction voltage calculator 420 in step S240. The prediction voltage may be calculated as a value having a preset time interval, and may be calculated as a section for a predetermined time interval.

The controller 460 may control the first voltage adjustment part 210 such that the apartment complex 70 is operated at the calculated recommendation voltage. The controller 460 may use the voltage adjustment parts 210 and 220 and may perform remote control such that the voltage of the apartment complex 70 reaches the calculated recommendation voltage.

Each of the voltage adjustment parts 210 and 220 may be a device provided for voltage control or reactive power control of the apartment complex 70, and may include at least one selected from the group of an on-load tap changer (OLTC), a step voltage regulator (SVR), a voltage regulator, an inverter, and a (power) shunt condenser (SC). For example, the voltage of a power line may be raised or lowered by adjusting the on-load tap changer, and reactive power control may be achieved through an input or open command to the phase modifying equipment of the condenser.

The prediction voltage calculator 420 of the present disclosure may calculate a prediction voltage on the basis of the power surplus storage amount D10 and the consumption demand amount D20 of the apartment complex 70. The adjustment voltage calculator 440 may use the prediction voltage to calculate an adjustment voltage. The controller 460 may perform control for operation such that the voltage of the apartment complex 70 reaches the recommendation voltage included in the optimal voltage section.

The prediction voltage or the adjustment voltage may be calculated as a direction or tendency including a voltage drop, a voltage hold, and a voltage rise, or may be calculated as a specific numerical value.

That is, the adjustment voltage of which the controller 460 issues the voltage adjustment parts 210 and 220 may indicate a direction or tendency of voltage including a voltage drop, voltage hold, or voltage rise, or may include a specific numerical value of a voltage drop, voltage hold, or voltage rise.

The direction of the adjustment voltage may be determined by comparing the prediction voltage with the optimal operation section for conservation voltage reduction (CVR). The prediction voltage may be expressed as the direction including a voltage drop, voltage hold, or voltage rise compared to the optimal operation section. The adjustment voltage may be expressed as the direction including a voltage drop, voltage hold, or voltage rise to the recommendation voltage included in the optimal operation section.

When the prediction voltage is calculated as being a voltage drop, the adjustment voltage may be controlled with a voltage rise. When the prediction voltage is calculated as being a voltage hold, the adjustment voltage may be controlled with a voltage hold. When the prediction voltage is calculated as being a voltage drop, the adjustment voltage may be controlled with a voltage rise.

Figure 13:
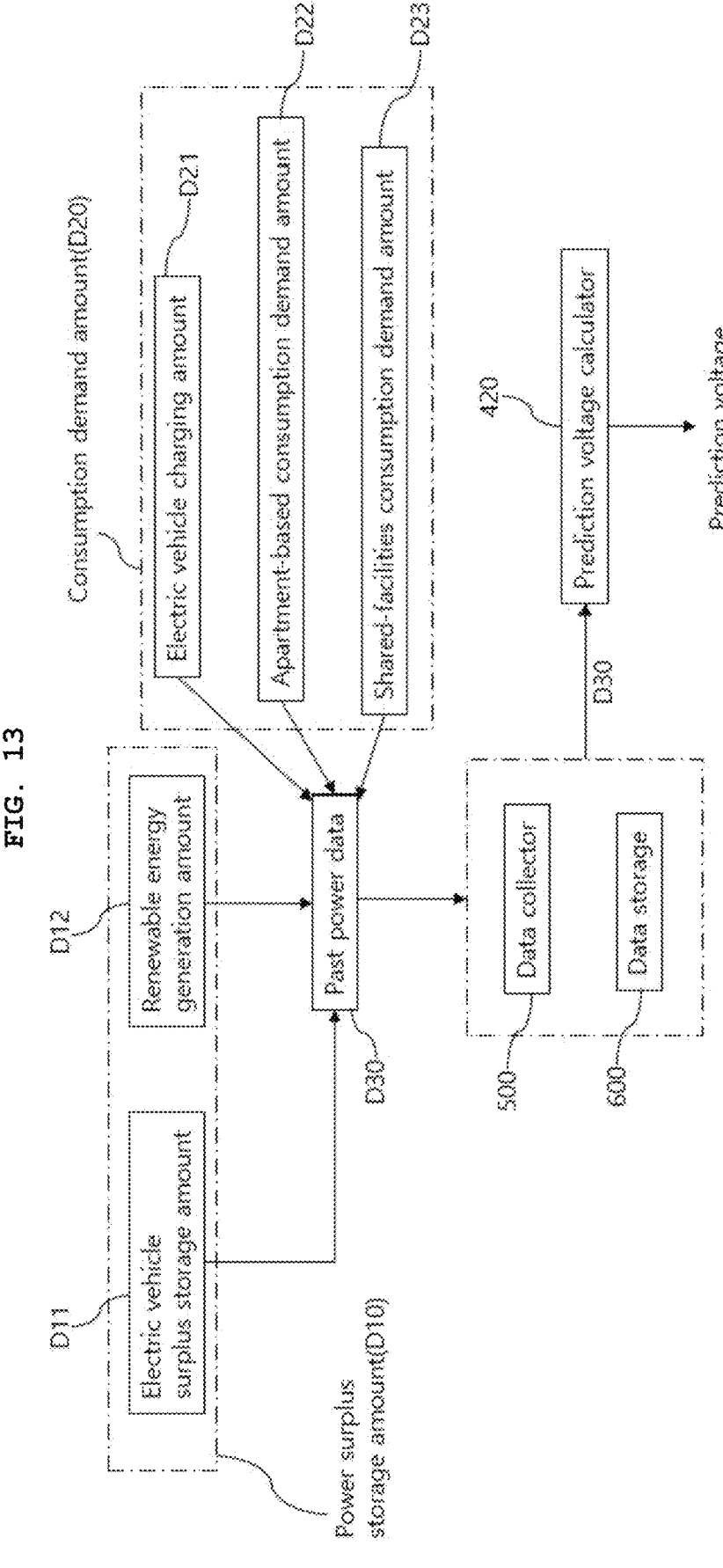
FIG. 13 is a block diagram illustrating construction of past power data of the present disclosure.
Figure 14:
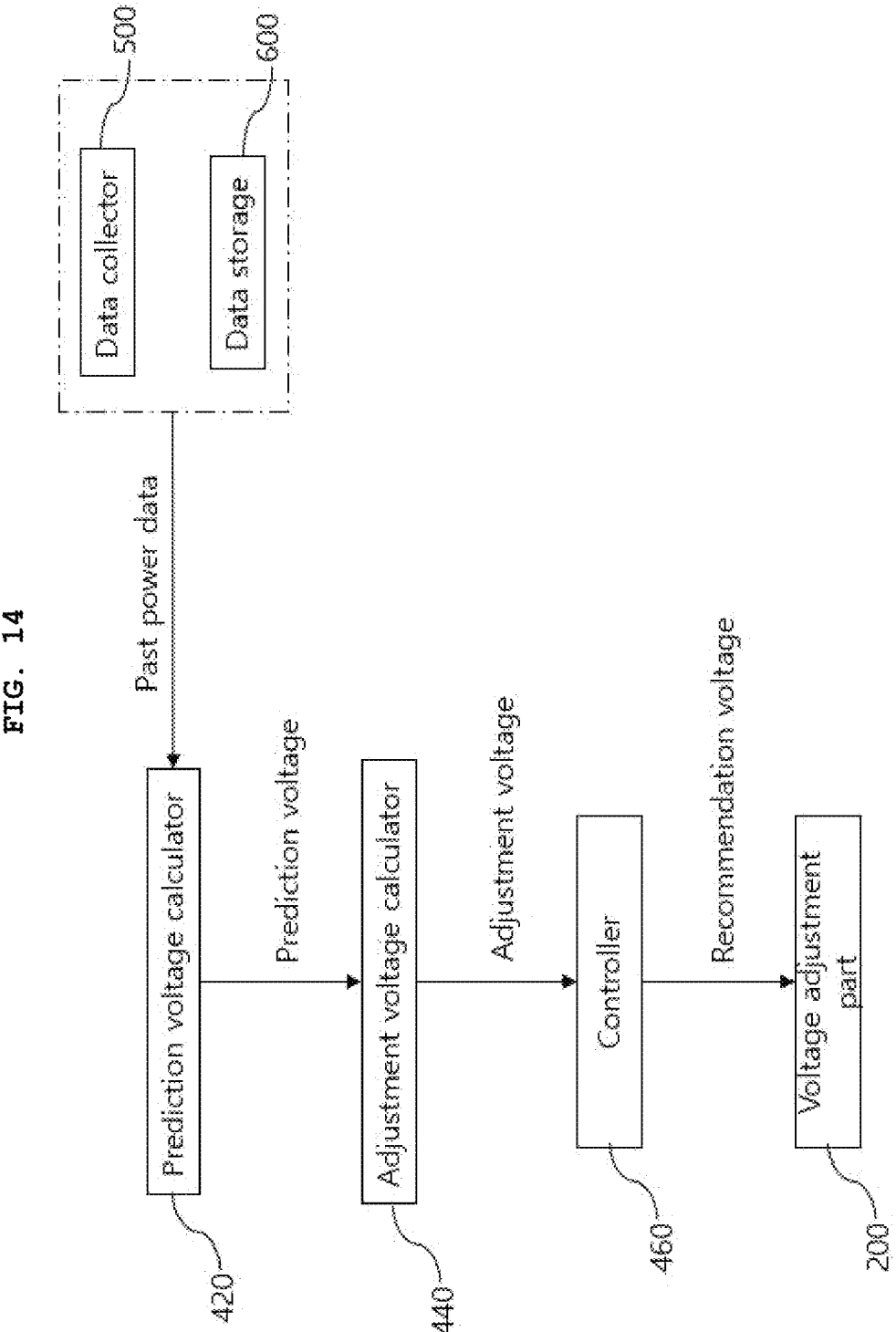
FIG. 14 is a flowchart illustrating calculation of a prediction voltage, an adjustment voltage, and a recommendation voltage of the present disclosure.

Referring to FIG. 13, past power data D30 may include the power surplus storage amount D10, which is the power that may be stored in the power storage 320 of the apartment complex 70, and the consumption demand amount D20.

The power surplus storage amount D10 may include the electric vehicle surplus storage amount D11 or the renewable energy generation amount D12.

The consumption demand amount D20 may be the power that the apartment complex 70 to be managed uses, and may include at least one selected from the group of the electric vehicle charging amount D21, an apartment-based consumption demand amount D22, and a shared-facilities consumption demand amount D23.

The power management device of the present disclosure may manage the power of the whole of the apartment complex 70, or may manage only the power related to the electric vehicle chargers L1 to L3.

When the power of the whole of the apartment complex 70 is managed, the past power data D30 may include the power surplus storage amount D10 and the consumption demand amount D20.

When only the power related to the electric vehicle chargers L1 to L3 of the apartment complex 70 is managed, the past power data D30 may include only the electric vehicle surplus storage amount D11 and the electric vehicle charging amount D21, and the prediction voltage, adjustment voltage, and recommendation voltage may be calculated on the basis of only information on the electric vehicle surplus storage amount D11 and the electric vehicle charging amount D21.

Hereinafter, the description of the power surplus storage amount D10 and the consumption demand amount D20 may be applied to the electric vehicle surplus storage amount D11 and the electric vehicle charging amount D21 as it is.

Referring to FIG. 15, the power surplus storage amount D20 may be calculated as being one of large, normal, small compared to a reference value. The reference value of the power surplus storage amount D20 may be an average power surplus storage amount, and may be set by the controller 460. The controller 460 may also set the optimal operation section that is a comparison reference for a voltage drop, voltage hold, or voltage rise of the prediction voltage.

The average power surplus storage amount may be obtained from the average of the electric vehicle surplus storage amount D11, the average of the renewable energy generation amount D12, or the average of the sum of the electric vehicle surplus storage amount D11 and the renewable energy generation amount D12.

Referring to FIG. 11, the controller 460 may use the past power data of the apartment complexes 71 and 72 to generate the load prediction model for calculating a recommendation voltage in the optimal operation section for conservation voltage reduction (CVR) in step S200.

The load prediction model of the present disclosure may include a series of steps from past power data to calculation of a recommendation voltage. That is, the load prediction model may calculate future power data by using the past power data stored in the data storage 600 or collected in the data collector 500.

Accordingly, the large, normal, or small consumption demand amount D20 may be a prediction result of calculation result of the future consumption demand amount D20 predicted from the past consumption demand amount D20 by the load prediction model.

In the present disclosure, a univariate prediction method or a multivariate prediction method may be used. In the univariate prediction method, future power data is predicted using the past power data D30 as an input value. In the multivariate prediction method, future power data is predicted using factors, such as time, a customer arrival rate, etc., in addition to the past power data D30.

When the consumption demand amount D20 is calculated as being larger than the reference value, such as an average consumption demand, the prediction voltage may be calculated as being a voltage drop or voltage hold, and the adjustment voltage may be controlled to be a voltage rise or voltage hold.

When the consumption demand amount D20 is calculated as being smaller than the reference value, such as the average consumption demand, the prediction voltage may be calculated as being a voltage rise or voltage hold, and the adjustment voltage may be controlled to be a voltage drop or voltage hold.

Accordingly, when the power consumption of the electric vehicle chargers L1 to L3, which are a load node, increases because of electric vehicle charging, the voltage of the apartment complex 70 may decrease. That is, the predicted consumption demand amount D20 and the prediction voltage may be inversely proportional to each other.

When the consumption demand amount D20 is calculated as normal, which is the same or similar to the reference value such as the average consumption demand, the prediction voltage may be calculated as being a voltage hold, and the adjustment voltage may be controlled to be a voltage hold.

The voltage hold may include the case in which the prediction voltage of the apartment complex 70 falls or rises, but voltage adjustment is not required because the degree of fall or rise is small, or the case in which the falling or rising prediction voltage is included within the optimal operation section for conservation voltage reduction (CVR).

The future power surplus storage amount D10 and the future consumption demand amount D20 may be expressed as being at least one of very low, low, maintained, high, and very high in terms of a direction or tendency, compared to respective reference values. As an example of the reference value, the controller 460 may set the average power surplus storage amount that is the comparison reference value of the future power surplus storage amount D10, or the average consumption demand amount that is the reference value of the future consumption demand amount D20.

When the power surplus storage amount D10 is predicted to be larger than the average power surplus storage amount and the consumption demand amount D20 is lower than the average consumption demand amount, additional power is supplied to the system and may cause an overvoltage, so voltage adjustment may be required. This corresponds to the case in which the future power surplus storage amount is high and the future consumption demand amount is low, and the prediction voltage may be a voltage rise and the adjustment voltage may be a voltage drop.

In the meantime, when the future power surplus storage amount D10 is low and the future consumption demand amount D20 is high, the prediction voltage may be a voltage drop and the adjustment voltage may be a voltage rise.

Accordingly, as in the above two cases, when the predicted power surplus storage amount D10 is low and the predicted consumption demand D20 is high or vice versa having opposite directions, the prediction voltage may be a voltage drop or a voltage rise. In addition, when the predicted power surplus storage amount D10 is low and the predicted consumption demand D20 is high or vice versa having opposite directions, the direction of the prediction voltage may be determined in proportion to the direction of the power surplus storage amount D10.

Either the predicted power surplus storage amount D10 or the predicted consumption demand amount D20 is low or high and the other is maintained, the prediction voltage may be determined by or in proportion to the result calculated as being low or high.

When the future power surplus storage amount D10 is low and the future consumption demand amount D20 is low, the prediction voltage may be a voltage drop, voltage hold, or voltage rise, and the adjustment voltage may be a voltage rise, voltage hold, or voltage drop.

When the future power surplus storage amount D10 is high and the future consumption demand amount D20 is high, the prediction voltage may be a voltage drop, voltage hold, or voltage rise, and the adjustment voltage may be a voltage rise, voltage hold, or voltage drop.

Accordingly, as described above, when the predicted power surplus storage amount D10 and the predicted consumption demand amount D20 have the same direction, a voltage drop, voltage hold, or voltage rise is possible by comparison between the predicted electric vehicle surplus storage amount and the predicted electric vehicle charging amount. In this case, high may be further divided into very high and high, and low may be further divided into very low and low.

When the future power surplus storage amount is very high and the future consumption demand amount is high, the prediction voltage may be a voltage rise and the adjustment voltage may be a voltage drop.

When the future power surplus storage amount is high and the future consumption demand amount is very high, the prediction voltage may be a voltage drop. When the future power surplus storage amount is low and the future consumption demand amount is very low, the prediction voltage may be a voltage rise.

When the future power surplus storage amount is very low and the future consumption demand amount is low, the prediction voltage may be a voltage rise and the adjustment voltage may be controlled to be a voltage drop. This is because when the power surplus storage amount is low, a voltage change due to a change in the consumption demand amount itself rather than the relationship between the power surplus storage amount and the consumption demand amount may be large. In addition, the direction of the voltage change and the consumption demand amount may tend to move in opposite directions. Therefore, when the power surplus storage amount is very low and the consumption demand amount is low, the prediction voltage is highly likely to be a voltage rise.

Referring to FIGS. 16 and 17, the structure of a voltage adjustment part of the power management device of the present disclosure may correspond to the case in which a plurality of individual loads are connected to one node the power receiving system and the first voltage adjustment part 210 is provided at the common node of the power receiving system, or the case in which in addition to the first voltage adjustment part 210, the second voltage adjustment part 220 is provided at each of the plurality of individual loads.

In the former structure of the first-stage voltage adjustment part 210, the first voltage adjustment part 210 is positioned higher than the loads, so when the voltage is adjusted, the voltages of all the loads may be changed simultaneously at the same rate. The load nodes may show different voltage distributions because of distances from the first voltage adjustment part 210 and device characteristics. Therefore, the power conditions of all the nodes of the power receiving system connected to the first voltage adjustment part 210 may be applied to a control command that the controller 460 issues to the first voltage adjustment part 210.

For example, when it is determined that the first apartment complex 71 has a voltage drop and the second apartment complex 72 has a voltage rise, the controller 460 may issue a voltage hold to the first voltage adjustment part 210.

The power management device can induce more stable voltage distribution by performing control considering how a voltage will change rather than adjusting a voltage considering only the current power state.

The power management device may predict the voltage of each node and examine a future voltage condition, and may estimate an adjustable voltage, and finally, the controller 460 may transmit a recommendation voltage to the first voltage adjustment part 210. The recommendation voltage may be within the allowable range for the operation of the equipment of each node. When the equipment of the node including each load is operated out of the allowable voltage range, the possibility of shortening the lifespan of the equipment or the possibility of equipment failure may increase.

For example, in the case in which the power management device manages the first apartment complex 71 and the second apartment complex 72, when the first apartment complex 71 is predicted to have a high voltage of 220 V and the second apartment complex 72 is predicted to have a low voltage of 208 V (compared to the optimal voltage), a 2-1 voltage adjustment part for adjusting the first apartment complex 71 performs control such that the voltage of the first apartment complex 71 drops and a 2-2 voltage adjustment part for adjusting the second apartment complex 72 performs control such that the voltage of the second apartment complex 72 rises. This voltage adjustment may be performed with only a direction or tendency, such as a rise and a drop, or with a specific numerical value, such as a drop by 8 V and a rise by 3 V.

As an embodiment, FIG. 16 may show that the adjustment voltages of the voltage adjustment parts 210 and 220 are expressed as a direction or tendency, such as a drop, hold, or rise, and FIG. 17 may show that the prediction voltages and the adjustment voltages are expressed as a specific numerical value. FIG. 17 may correspond to the case in which a load of a node of the power receiving system is for home use and a nominal voltage is 220 V, and the case in which the optimal operation section of the node is set to a range of 210 to 213 V.

When it is determined the voltage adjustment part 200 has a voltage drop or a voltage rise, the controller 460 may transmit a voltage control command such that the recommendation voltage is included within the optimal operation section.

Specifically, when a voltage rise or voltage drop of the second voltage adjustment part 220 is determined, the controller 460 may calculate a specific prediction voltage and adjustment voltage for each apartment complex 70 such that the recommendation voltage of each apartment complex 70 for which the voltage rise or voltage drop is determined is included within the optimal operation section.

As in the first case, when the first voltage adjustment part 210 is controlled for a voltage drop or voltage rise, the first voltage adjustment part 210 may be controlled such that both of the recommendation voltages of the first apartment complex 71 and the second apartment complex 72 that are all the low-level nodes connected to the first voltage adjustment part 210, which is the high-level node, are included in the optimal operation section.

For example, when the optimal operation section is a range of 210 to 213 V and the prediction voltage of the first apartment complex 71 is a high voltage of 225 V and the prediction voltage of the second apartment complex 72 is a high voltage of 223 V, the second voltage adjustment part 220 may be controlled to for a voltage hold and the first voltage adjustment part 210 may be controlled to for a voltage drop. In this case, it is preferable that the adjustment voltage of the first apartment complex 71 is determined to be within a range of 12 to 15 V and the adjustment voltage of the second apartment complex 72 is determined to be within a range of 10 to 13 V. Therefore, it is preferable to control the first voltage adjustment part 210 for a voltage drop such that the adjustment voltage ranges of the two apartment complexes 71 and 72 overlap within a range of 12 to 13 V.

Figure 18:
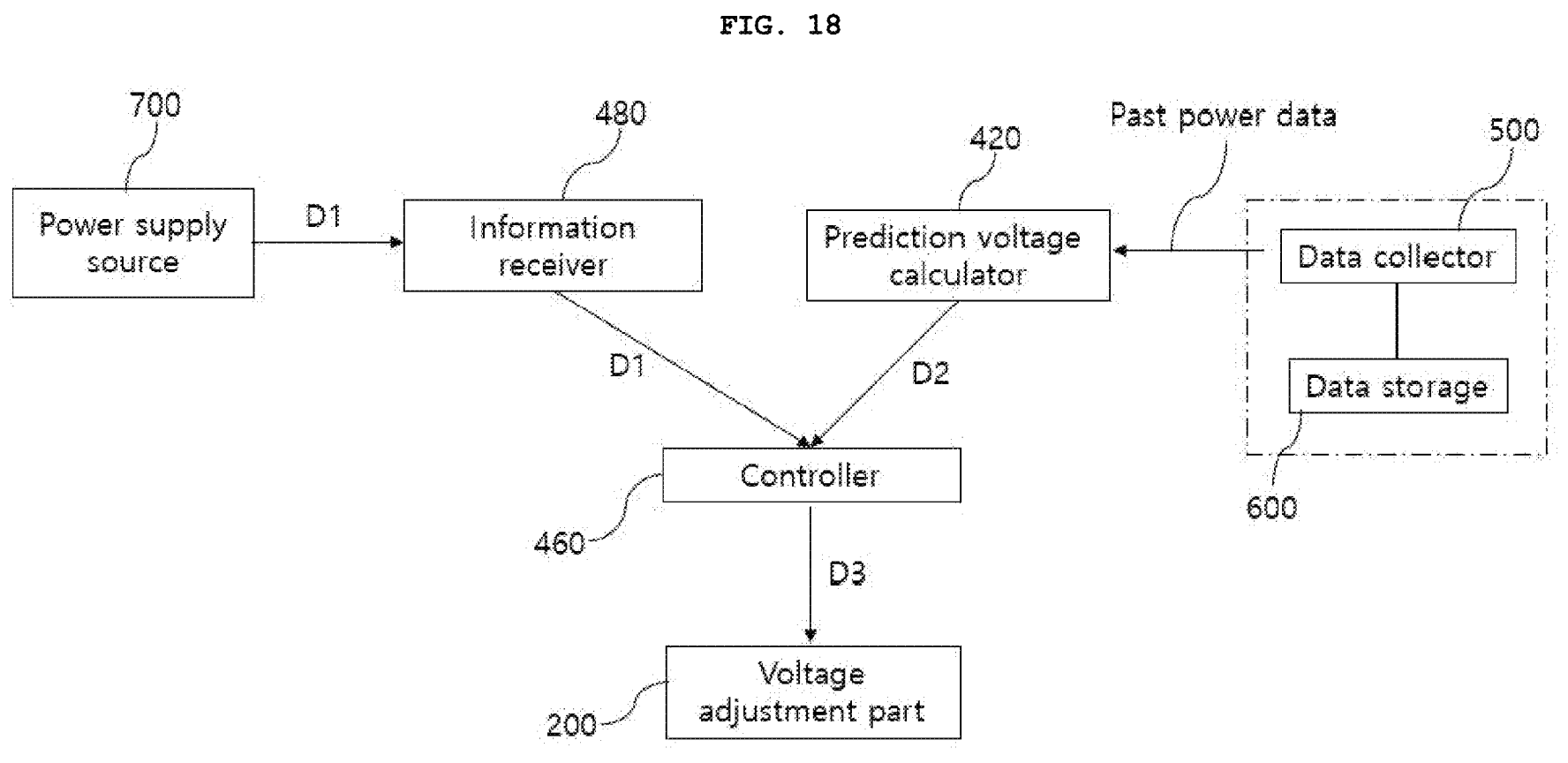

With reference to FIGS. 18 to 20, a relationship between a high-level system voltage adjustment command and low-level system voltage adjustment of the present disclosure will be described.

An embodiment of a power control command that the power exchange 700 issues to the power system may include a method in which a user or consumer sells a power market as much electricity as saved and is rewarded with money, or a method in which when power demand is low and power supply is plentiful, a user or consumer is rather paid for higher power consumption, such as storing surplus power. The former case may correspond to a power control command for controlling a node of a low-level system for a voltage drop, and the latter case may correspond to a power control command for controlling the node of the low-level system node for a voltage rise.

The voltage drop command from the high-level system of the power system 10 may be referred to as high-level conservation voltage reduction (high-level CVR), and the final voltage drop adjustment from the low-level system of the power system 10 may be referred to as low-level conservation voltage reduction (low-level CVR). Accordingly, the power management device of the present disclosure is to link the high-level CVR and the low-level CVR.

An information receiver 480 may receive information on voltage adjustment performed by the high-level system from the power supply source 700. Information including the control start time before performing voltage control on the power system by the power supply source 700, a voltage adjustment rate, etc. may be transmitted from the power supply source 700 to the information receiver 480 through wired or wireless communication.

The past power data of the apartment complex 70, which is positioned downstream in the power system, may be transmitted from the data collector 500 or the data storage 600 to the prediction voltage calculator 420. The prediction voltage calculator 420 may use the load prediction model based on machine learning, to calculate a prediction voltage of a node of the low-level system node from the past power data. Second data D2 transmitted from the prediction voltage calculator 420 to the controller 460 may include a prediction voltage of a node of the low-level system.

Accordingly, the controller 460 may receive, from the information receiver 480, first data D1 including a voltage adjustment command of the high-level system, and may receive, from the prediction voltage calculator 420, the second data D2 including a prediction voltage of the apartment complex 70.

The controller 460 may combine the first data D1 and the second data D2 to calculate third data D3 that is voltage adjustment including a recommendation voltage for which the voltage adjustment parts 210 and 220 are finally controlled, and may transmit the third data D3 to the voltage adjustment parts 210 and 220.

The high-level system voltage adjustment included in the first data D1 may include a voltage drop, voltage hold, or voltage rise. The prediction voltage of a node of the low-level system included in the second data D2 may include a voltage drop, voltage hold, or voltage rise.

A combined voltage determined by the combination of the first data D1 and the second data D2 may include a low voltage, voltage hold, or high voltage. The low voltage, voltage hold, or high voltage of the combined voltage may be determined by being compared to the optimal operation section calculated for conservation voltage reduction (CVR) a node of the power receiving system.

When there is voltage adjustment of the high-level system, the management server 400 or the controller 460 of the present disclosure may receive the voltage adjustment and may control the voltage of a node of the power receiving system considering voltage change prediction information of each individual load.

When information on implementation of the voltage adjustment of the high-level system is received, adjustment to a recommendation voltage for preparation despite the voltage adjustment may minimize the loss caused by the voltage adjustment, and the voltage may be continuously maintained in an optimal operation range within the allowable voltage range, thereby achieving the conservation voltage reduction effect.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A power management device, wherein power supplied from a power system to an apartment complex is distributed to facilities in the apartment complex including an electric vehicle charger through a switchboard installed in the apartment complex, the power management device comprising:

a pattern analyzer configured to analyze a demand pattern that is a power pattern for consumption by the apartment complex;

a charging scheduler configured to receive a first demand pattern from the pattern analyzer, and to calculate a second demand pattern obtained by adjusting charging time of the electric vehicle charger by using a basic pattern of the first demand pattern as a fixed value and using a charging pattern as a variable value, so as to minimize a difference between a maximum demand and a minimum demand in the first demand pattern;

a prediction voltage calculator configured to receive power data from the pattern analyzer, and to calculate a prediction voltage of the apartment complex based on past power data including electric-vehicle charging amount and electric-vehicle surplus storage amount, and to determine a future voltage tendency based on comparison between a future electric-vehicle surplus storage amount and a future electric-vehicle charging amount; and a controller configured to calculate a recommendation voltage for conservation voltage reduction (CVR) by using the prediction voltage, the controller being further configured to set an optimal operation section for CVR such that a transformer capacity of the apartment complex is maintained within an allowable range, to compare the second demand pattern with the recommendation voltage, and, when the recommendation voltage does not satisfy an operation power satisfying the second demand pattern, to update the recommendation voltage by using the second demand pattern as past power data and to recalculate the predicted voltage, wherein the controller is configured to perform control such that the recommendation voltage is an operation power of the apartment complex, and the operation power satisfies the second demand pattern, wherein the power management device further comprises a plurality of voltage adjusters including a first voltage adjuster disposed at an upstream node of a distribution line and a plurality of second voltage adjusters respectively disposed at downstream nodes corresponding to a plurality of apartment complexes, and each adjustment voltage of the first and second voltage adjusters is determined based on relationships among predicted voltages of the downstream nodes;

wherein the charging scheduler is configured to set an objective function for spreading charging demand of the apartment complex, the objective function includes at least one selected from a group of a maximum demand of the demand pattern, a difference between the maximum demand and a minimum demand of the demand pattern, a variation value of the demand pattern, and charging cost, the charging scheduler is configured to calculate charging start time of the electric vehicle charger for minimizing the objective function, and the second demand pattern is obtained by applying the charging start time for minimizing the objective function in the first demand pattern.

2. The power management device of claim 1, wherein the demand pattern includes consumption demand from each apartment of the apartment complex, consumption demand from a shared part of the apartment complex, and an electric vehicle charging amount of the electric vehicle charger, and the second demand pattern is obtained by flattening a total demand pattern by spreading the electric vehicle charging amount in the first demand pattern.

3. The power management device of claim 1, wherein the demand pattern is divided into a basic demand pattern and a charging demand pattern, the basic demand pattern includes consumption demand from each apartment of the apartment complex, and consumption demand from a shared part of the apartment complex, the charging demand pattern includes an electric vehicle charging amount of the electric vehicle charger installed in the apartment complex, the charging scheduler is configured to calculate the second demand pattern by using the basic pattern of the first demand pattern as a fixed value and using the charging pattern as a variable value, and the second demand pattern is obtained by adjusting the charging time of the electric vehicle charger so as to minimize a difference between a maximum demand and a minimum demand in the first demand pattern.

4. The power management device of claim 1, wherein the charging scheduler has a first mode and a second mode, in the first mode, the charging start time calculated by the charging scheduler is simultaneously applied to electric vehicles parked in the apartment complex, and in the second mode, the charging start time calculated by the charging scheduler is delayed differently considering options to electric vehicle users who want to charge the electric vehicles.

5. The power management device of claim 1, further comprising an adjustment voltage calculator configured to calculate an adjustment voltage for conservation voltage reduction (CVR) by using the prediction voltage, wherein the controller is configured to control a voltage of the apartment complex with the recommendation voltage to which the adjustment voltage is applied, to set an optimal operation section in which the voltage of the apartment complex is subjected to conservation voltage reduction (CVR), to determine the adjustment voltage by comparing the prediction voltage with the optimal operation section, and to perform control such that the recommendation voltage of the apartment complex is included in the optimal operation section having a conservation voltage reduction effect.

6. The power management device of claim 1, wherein the pattern analyzer is configured to transmit, to the prediction voltage calculator, past power data of the apartment complex used to calculate the prediction voltage, the past power data includes consumption demand for consumption by the apartment complex, and a power surplus storage amount generated by the apartment complex and supplied to a power storage installed in the apartment complex, when a future power surplus storage amount is lower than a future consumption demand, the prediction voltage is calculated as being a voltage rise, a voltage hold, or a voltage drop, or when the future power surplus storage amount is equal to the future consumption demand, the prediction voltage is calculated as being a voltage hold, or when the future power surplus storage amount is higher than the future consumption demand, the prediction voltage is calculated as being a voltage hold or a voltage rise.

7. The power management device of claim 1, wherein the demand pattern includes consumption demand from each apartment of the apartment complex, consumption demand from a shared part of the apartment complex, and an electric vehicle charging amount of the electric vehicle charger, on the basis of analysis of the demand pattern by the pattern analyzer, the prediction voltage, an adjustment voltage, and the recommendation voltage are calculated, and an optimal operation section subjected to conservation voltage reduction (CVR) is set by time, and the recommendation voltage is included in the optimal operation section and satisfies the operation power.

8. The power management device of claim 1, wherein the operation power is within an allowable capacity of a transformer of the apartment complex, and the demand pattern includes consumption demand from each apartment of the apartment complex, consumption demand from a shared part of the apartment complex, and an electric vehicle charging amount of the electric vehicle charger.

9. The power management device of claim 1, wherein the apartment complex is set to receive the power with a second supply capacity from a power supply source that is a high-level system of the power system, a first supply capacity is within an allowable capacity of a transformer of the apartment complex, and is equal to or larger than a maximum demand of the demand pattern, a power surplus storage amount is the power stored in a power storage installed in the apartment complex, the second supply capacity is determined from the first supply capacity and the power surplus storage amount, and the second supply capacity is smaller than the maximum demand.

10. The power management device of claim 9, wherein the power surplus storage amount includes an electric vehicle surplus storage amount of an electric vehicle parked in the apartment complex, or a renewable energy generation amount generated by a renewable energy generator installed in the apartment complex.

11. The power management device of claim 1, wherein the controller is configured to receive the second demand pattern from the charging scheduler, and to compare the second demand pattern with the recommendation voltage, and when the recommendation voltage does not satisfy the operation power satisfying the second demand pattern, the second demand pattern is used as past power data to calculate a new recommendation voltage.

\* \* \* \* \*